United States Patent [19]

Myers et al.

[11] 4,400,788
[45] Aug. 23, 1983

[54] CONTINUOUS SPEECH PATTERN RECOGNIZER

[75] Inventors: Cory S. Myers, Brookline, Mass.; Frank C. Pirz, Madison; Lawrence R. Rabiner, Berkeley Heights, both of N.J.

[73] Assignee: Bell Telephone Laboratories, Incorporated, Murray Hill, N.J.

[21] Appl. No.: 248,570

[22] Filed: Mar. 27, 1981

[51] Int. Cl.³ .............................................. G10L 1/00
[52] U.S. Cl. .................................. 364/513; 179/1 SD
[58] Field of Search .................... 179/1 SB, 1 SD; 364/513, 156; 340/146.3 AQ, 146.3 WD

[56] References Cited

U.S. PATENT DOCUMENTS

| | | | |
|---|---|---|---|
| 4,049,913 | 9/1977 | Sakoe | 179/1 |
| 4,059,725 | 11/1977 | Sakoe | 179/1.5 |
| 4,092,493 | 5/1978 | Rabiner et al. | 179/1 |
| 4,156,868 | 5/1979 | Levinson | 340/146.3 |

OTHER PUBLICATIONS

Itakura, "Minimum Prediction Residual Applied to Speech Recognition," IEEE Trans. on Acoustics etc., Feb., 1975, pp. 67-72.
Rabiner, "Considerations in Dynamic Time Warping ...", IEEE Trans. on Acoustics, etc., Dec., 1978, pp. 575-582.
Design Engineering, "Microprocessor Basics: Part 24", Electronic Design, Feb. 15, 1979, pp. 128-139.

*Primary Examiner*—Emanuel S. Kemeny
*Attorney, Agent, or Firm*—Kurt C. Olsen; Jack S. Cubert

[57] ABSTRACT

This speech recognizer concatenates a string of reference isolated-words for comparison with the unknown string of connected-words. The invention includes a level-building (LB) algorithm, "level" implying a location in a sequence of words. A constrained endpoint dynamic-time-warp algorithm, in which the slope of the warping function is restricted between $\frac{1}{2}$ and 2, is used to find the best alignment between an unknown continuous-word test pattern, and a concatenated sequence of L reference patterns. Properties of the LB algorithm include: modification of the references; back-track decision logic; heuristic selection of multiple candidates, and syntax constraints. As a result, the processing required is less than two-level dynamic-program-matching and sampling algorithms.

50 Claims, 12 Drawing Figures (UTTERANCE ANALYSIS)

(INITIALIZE MODE)

(SCAN MODE)

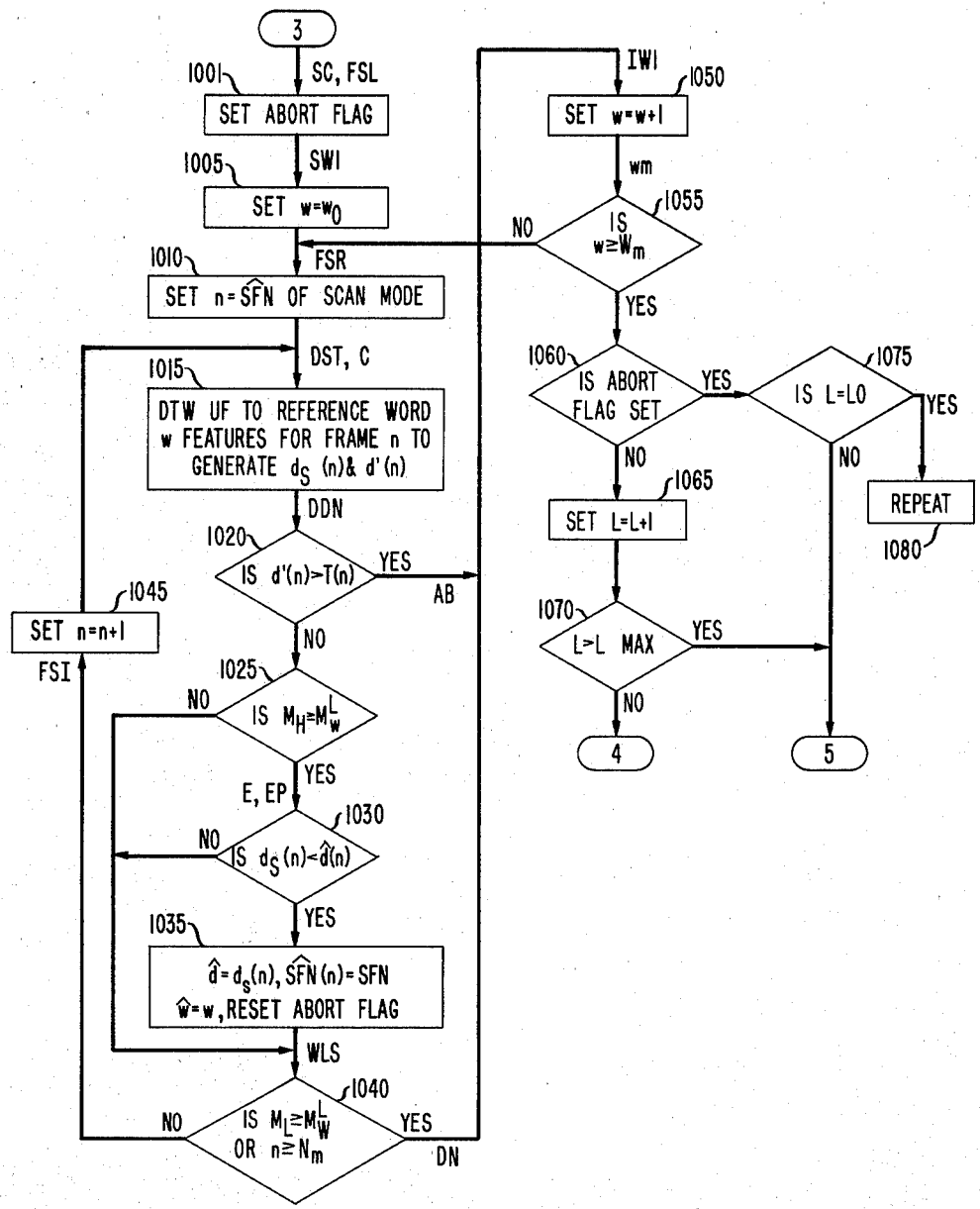

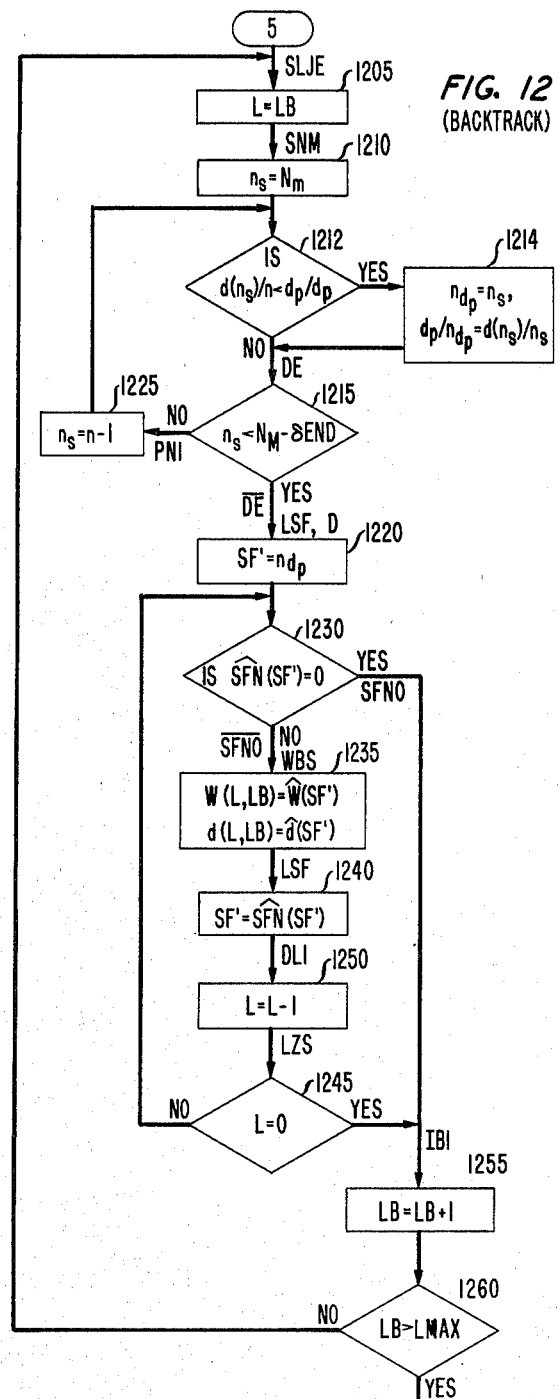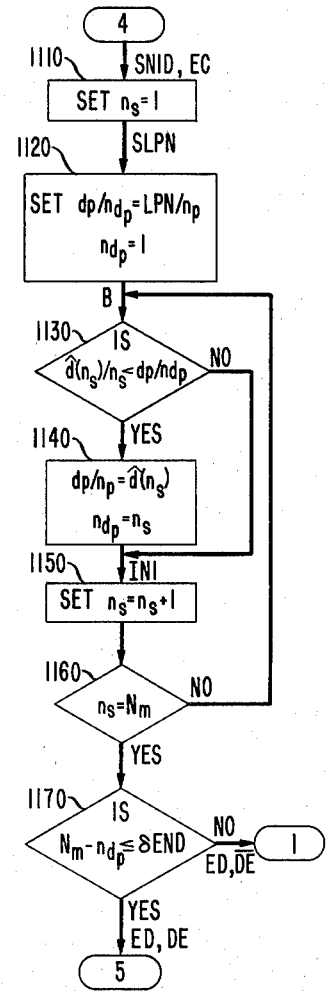

CONTINUOUS SPEECH PATTERN RECOGNIZER

BACKGROUND OF THE INVENTION

Our invention relates to pattern recognition and more particularly to arrangements for automatically recognizing a continuous speech pattern as a series of words.

In communication, data processing, and control systems, it is often desirable to use speech as a direct input for inquiries, commands, data or other information. Speech recognition devices obviate the need for manually operated terminal equipment and permit individuals to interact with automated equipment while simultaneously engaging in other activities. The variability of speech patterns from speaker to speaker and even for a particular speaker, however, has limited the accuracy of speech recognition. As a result, speech recognition arrangements have been most successful in specially designed environments.

Speech recognition systems are generally adapted to transform input speech signals into sets of prescribed acoustic features. The acoustic features of the input speech signals are compared to stored sets of previously obtained acoustic features of identified reference words. The speech signal is identified when the input speech features match the stored features of a particular reference word sequence in accordance with predetermined recognition criteria. The accuracy of such recognition systems is highly dependent on the selected features and on the prescribed recognition critieria. Best results are obtained when the reference features and the input speech features are derived from the same individual and the input speech pattern to be recognized is spoken with distinct pauses between individual words.

Recognition of continuous speech patterns may be accomplished by comparing the sequence of input speech features with every possible combination of reference word feature signal patterns derived from continuous speech. Such arrangements, however, require time consuming testing on all possible reference word pattern combinations and an exhaustive search through the large number of reference word combinations. As is well known, the number of possible sequences increases exponentially with the number of words in the series. Consequently, it is generally impractical to perform the exhaustive search even for a limited number of words in a speech pattern.

Semantic and syntactic rules may be devised to limit the number of possible sequences in a search so that certain classes of information can be readily analyzed. U.S. Pat. No. 4,156,868, issued to S. E. Levinson, May 29, 1979, and assigned to the same assignee, for example, discloses a recognition arrangement based on syntactic analysis in which an input speech pattern is compared to only syntactically possible reference patterns. But recognition of sequences of unrelated spoken words such as a series of spoken numbers is not improved by resorting to such contextual constraints.

U.S. Pat. Nos. 4,049,913 and 4,059,725 disclose continuous speech recognition systems in which the similarity between individual reference word feature patterns and the features of all possible intervals of the input speech pattern are calculated. Partial recognition results are derived for each reference word feature pattern from the similarity measures. Both the partial similarity measures and the partial recognition results are stored in a table. The recognized results from the table are extracted to provide the reference word series corresponding to the input speech pattern. All possible partial pattern combinations from the table which form continuous patterns are selected. The selected pattern for which the similarity is maximum is then chosen. While these systems have been effective in continuous speech recognition, the signal processing to obtain reference patterns and partial pattern similarity measures is exceedingly complex and uneconomical for many applications.

U.S. patent application Ser. No. 138,647 of F. C. Pirz and L. R. Rabiner filed Apr. 8, 1980 assigned to the same assignee discloses a continuous speech analyzer adapted to recognize an utterance as a series of reference words for which acoustic feature signals are stored. Responsive to the utterance and reference word acoustic features, at least one reference word series is generated as a candidate for the utterance. Successive word positions for the utterance are identified. In each word position, partial candidate series are generated by determining reference word corresponding utterance segments and combining reference words having a prescribed similarity to the utterance segments with selected partial candidate series of the preceding word position. The determined utterance segments are permitted to overlap a predetermined range of the utterance segment for the preceding word position candidate series to account for coarticulation and differences between acoustic features of the utterance and those for reference words spoken in isolation.

The last mentioned arrangement significantly reduces the signal processing complexity by selecting particular candidate partial word series for each successive interval of the unknown utterance and also improves recognition in the presence of coarticulation. The selection of certain candidates at each word position, however, precludes other possible reference word series candidates from consideration as the recognition progresses through each word position. Consequently, the accuracy of utterance recognition is limited for longer utterances. It is an object of the invention to provide improved recognition of continuous speech pattern with limited signal processing requirements.

SUMMARY OF THE INVENTION

The invention is directed to recognizing a continuous speech pattern as a string of prescribed reference words. Signals representative of the time sequence of acoustic features of the individual reference words from a beginning frame to an endframe are stored. A time sequence of signals corresponding to the continuous speech pattern acoustic features is produced. Jointly responsive to the speech pattern feature signals and the feature signals of the reference words, a plurality of reference word strings is generated. The speech pattern is identified as one of the generated reference word strings.

The reference word candidate string generation includes providing a set of signals that identify successive word levels for the speech pattern. A speech pattern signal is assigned to each successive level.

At each successive level, the word level speech pattern segment feature signals and each reference word feature signals are time registered for the acoustically possible frames of the reference feature patterns to produce time registration speech pattern segment endframe signals and time registration corresponding signals for each reference word. Reference word strings are selected responsive to the time registration endframe and correspondence signals of the levels.

According to one aspect of the invention, the best correspondence signal for each level endframe, a signal representative of the best corresponding reference word for each level endframe and a signal representative of the starting frame for the best corresponding reference word time registration are stored.

According to another aspect of the invention the time registration starting frames of the speech pattern segment at each level are restricted to the time registration ending frames of the preceding level.

According to yet another aspect of the invention, the time registration starting frame range of the speech pattern segment at each level are restricted to the preceding level endframe range having limit best correspondence signal less than the minimum best correspondence signal of the preceding level.

According to yet another aspect of the invention, the range of reference word frames for time registration with each speech pattern segment frame is selected to reduce coarticulation effects. The reference word range lower limit frame is extended to the reference word beginning frame responsive to the selected reference word lower limit frame being less than a first predetermined number and the reference word range upper limit frame is extended to the reference word endframe responsive to the selected upper reference word limit frame being greater than a second predetermined number.

According to yet another aspect of the invention, a time registration speech pattern segment endframe is detected responsive to the reference word range upper limit frame being equal to or greater than the reference word endframe.

According to yet another aspect of the invention, a time registration correspondence signal is generated for each level speech pattern segment frame. A maximum allowable correspondence signal is generated for said level speech pattern segment frame and the time registration for each reference word is terminated responsive to the time registration correspondence signal being greater than the maximum allowable time registration signal for said frame.

According to yet another aspect of the invention, the reference word range lower limit frame for time registration with each speech pattern segment frame is compared to the reference word ending frame and the level time registration for each reference word is terminated responsive to the reference word lower limit frame being equal to or greater than the reference word endframe.

According to yet another aspect of the invention, the reference words for time registration at each level are selected responsive to the level identification signals.

and

Figure 1:
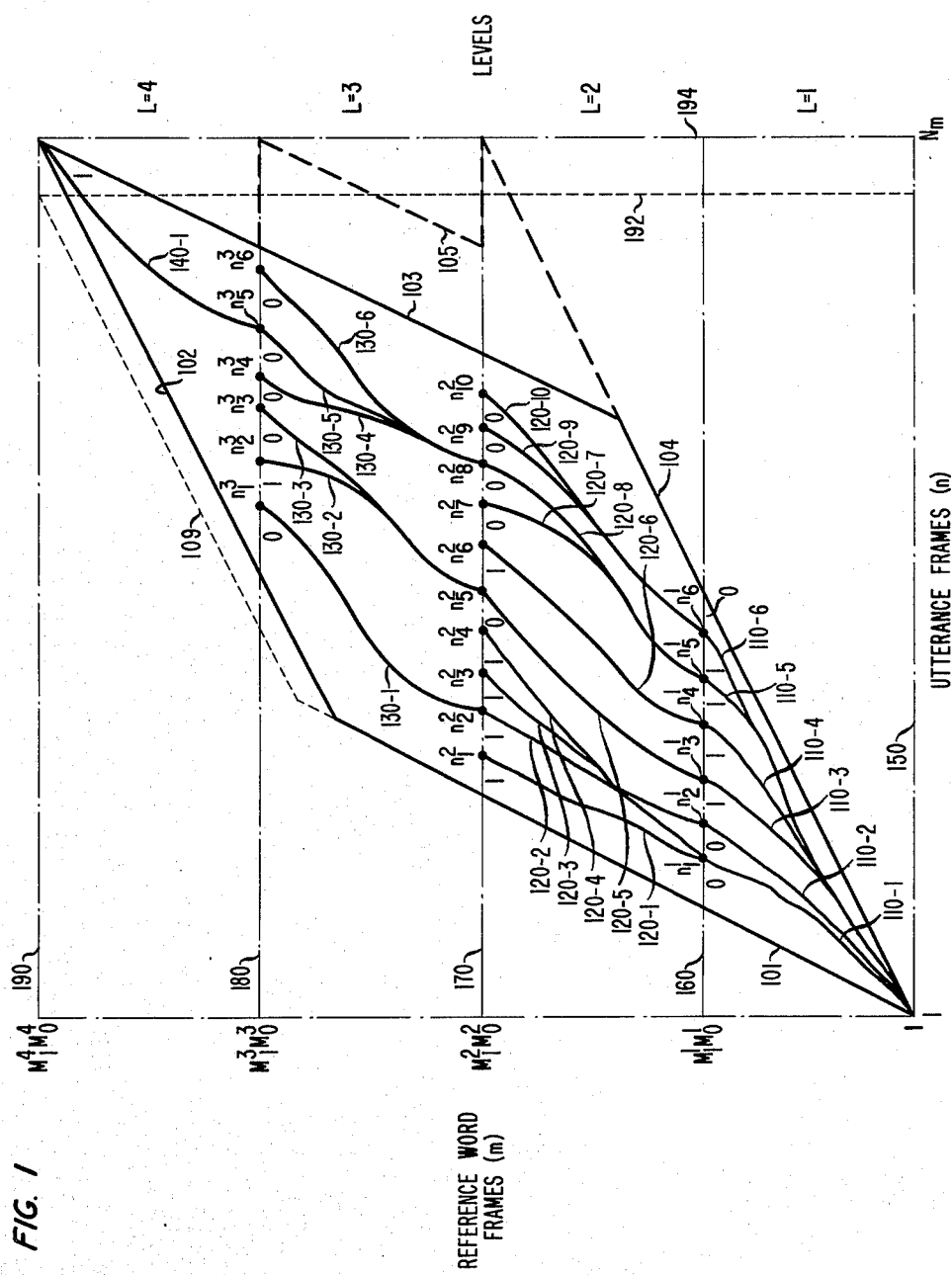
FIG. 1 illustrates graphically a continuous speech recognition process illustrative to the invention.

FIGS. 7 through 12 show detailed flow diagrams illustrating the speech recognition arrangements according to the invention.

GENERAL CONSIDERATIONS

In the recognition of continuous speech such as a connected word pattern, a time sequence of acoustic feature signals $$R^v = R^v(1), R^v(2), -, R^v(M_v) \quad (1)$$

is stored for each of a set of reference words. The features may be derived from a spectral, predictive, or other type of analysis of utterances of each reference word $R^v, 1 \leq v \leq V$ as is well known in the art. A time sequence of acoustic feature signals $$T = T(1), T(2), -, T(N_m) \quad (2)$$

is derived from a similar analysis of an input speech pattern. In general, all possible strings of reference words are synthesized and the sequence of feature signals for each string is compared to the input utterance feature signal sequence. The closest corresponding string is identified as the input utterance. Since the rate of speech varies widely, the well-known technique of dynamic programming may be employed to time register the reference word string features to the input utterance features. In this way, a relatively accurate measure of the correspondence between the reference word strings and the input utterance can be obtained.

Each reference word string is a concatenation of reference words $$R^S = R^{v1} \oplus R^{v2} - \oplus R^{vLmax} \quad (3)$$

The acoustic feature signals of string $R^S$ are dynamically time warped (DTW) to the feature signals of the utterance to generate the minimum DTW distance signal between the reference word string feature vector $$R^S = R^{v1}(1), R^{v1}(2), -R^{v1}(M_{v1}), R^{v2}(1),$$

$$R^{v2}(2), -R^{v2}(M_{v2}), -R^{vLmax}(1),$$

$$R^{vLmax}(2) -, R^{vLmax}(M_{vLmax}) \quad (4)$$

and the utterance feature vector $$T = T(1), T(2), -T(n), -T(N_m) \quad (5)$$

The cumulative distance signal obtained by time warping string $R^S$ to utterance feature vectors of T is $$D(T,R^S) = \min_{w(n)} \sum_{n=1}^{N_m} d(T(n), R^S(w(n))) \quad (6)$$

where w(n) is the warping factor between feature vectors T and $R^S$ and $d(T(n), R^S(w(n))) = d(n, w(n))$ is the local
distance between the feature vectors of frame n of the utterance T and frame m=w(n) of string $R^S$. w(n) is usually restricted so that the endpoints of the utterance match the endpoints of the string and the slope of warping factor w(n) is selected to correspond to the range of expected speech pattern frames. The direct application of dynamic time warping to all possible strings $R^S$ results in an uneconomic and time consuming amount of signal processing even for a modest number of reference words.

In accorance with the invention, the dynamic time warping is partitioned into successive levels so that the signal processing is substantially reduced. Each level corresponds to one position in a string of connected words comprising an input utterance. The number of strings $R^S$ which are considered as candidates for the input utterance, however, is not restricted whereby the recognition accuracy is not impaired. FIG. 1 illustrates the level processing arrangement. The horizontal axis of FIG. 1 corresponds to the successive frames of the utterance $1, 2, -n, -N_m$. There is an utterance segment assigned to each level which is defined by acoustic time registration limitations. The vertical axis is divided into levels $L=1, 2, -L_{max}$ where $L_{max}$ is the largest expected number of words in the utterance. In FIG. 1 there are, for example, $L_{max}=4$ levels. Each level on the vertical axis is divided into frames m of the reference words. For each reference word w, level L has $M_w$ frames. The ending frame for each reference word w at level L is $M_w{}^L$. The number of frames is generally different for each reference word since the reference word patterns are of different durations. For simplicity in FIG. 1, however, the two reference words $w=0,1$ are the same duration; $M_0{}^L=M_1{}^L$, as seen on the left vertical scale of the graph. The feature signals of every reference word $R_v$ are time warped to the utterance segment beginning from the starting frames of the level.

For each reference word, the possible time registration paths between the reference word and the utterance segment for the level are mapped through points (n,m) in accordance with $$D_A(n,m) = \tilde{d}(n,m) + \min D_A(n-1,j) \quad m-I_2 \leq j \leq m-I_1 \quad (7)$$

where $1 \leq n \leq N_m$ are the utterance frames, $1 \leq m \leq M_w$ are the reference word frames for the level and $D_A(n,m)$ is the accumulated distance signal along the path at point n,m. $\tilde{d}(n,m)$ is the local distance between the utterance feature vectors at utterance frame n and the reference word feature vector at reference word frame m. The rightmost term in Equation 7 represents the accumulated distance to utterance frame $n-1$ and reference word $R^S$ frame $m-I_2 \leq j \leq m-I_1$. Frame $I_1$ is chosen to conform to the allowable speech rate difference range. It is usually set at 1 if $w(n-1)=w(n-2)$ and is set to zero otherwise. $I_2$ is typically set to 2. Thus, j extends over the range from $m-2$ to $m-1$ if $w(n-1)=w(n-2)$ and extends over the range from $m-2$ to m otherwise. Dynamic time warping arrangements are described in greater detail in the article "Minimum Prediction Residual Applied to Speech Recognition" by F. Itakura, *IEEE Transactions on Acoustics, Speech, and Signal Processing*, Vol. ASSP-23, pp. 67-72, February, 1975 and the article "Considerations in Dynamic Time Warping Algorithms for Discrete Word Recognition" by L. R. Rabiner, A. E. Rosenberg and S. E. Levinson, *IEEE Transactions on Acoustics, Speech and Signal Processing,"* Vol. ASSP-26, pp. 575-582, December, 1978.

The path starting frame and the path ending frame as well as the cumulative distance between the reference word and utterance features over each path are determined through the dynamic time warp processing according to Equation 7. The utterance endframes of the level correspond to possible path starting frames of the next level. For each level endframe, the minimum cumulative distance thereto, the reference word corresponding to the minimum cumulative distance signal and the level starting frame for the minimum cumulative distance path are stored. After the last level processing is completed the closest corresponding sequence is reconstructed from the stored distance signals, reference words, level endframes and level starting frames.

Referring to FIG. 1, the dynamic time warping processing is restricted to the region of expected speech frames to avoid unnecessary processing. For example, the beginning frame of the utterance $n=1$ in FIG. 1 cannot correspond acoustically to the endframe of any of the reference words. In like manner, other regions of FIG. 1 are not acoustically possible. Consequently DTW processing may be limited to the region of acoustically probable speech frames without loss of recognition accuracy. In FIG. 1, the DTW processing is restricted to the region bounded by lines 101, 102, 103, and 104 for an input utterance of four words. The extreme points of the permitted region correspond to the endpoints of the possible reference word strings and the utterance. The parallelogram bounded by lines 101, 102, 103, and 104 represents a two to one speedup and a two to one reduction in speech rate between the reference word strings and the utterance. These boundary lines are fixed by the range restrictions of Equation 7. While the region for DTW processing illustrated in FIG. 1 are appropriate for the invention, it is to be understood that other restrictive arrangements well known in the art may be selected for use with the invention.

Figure 6:
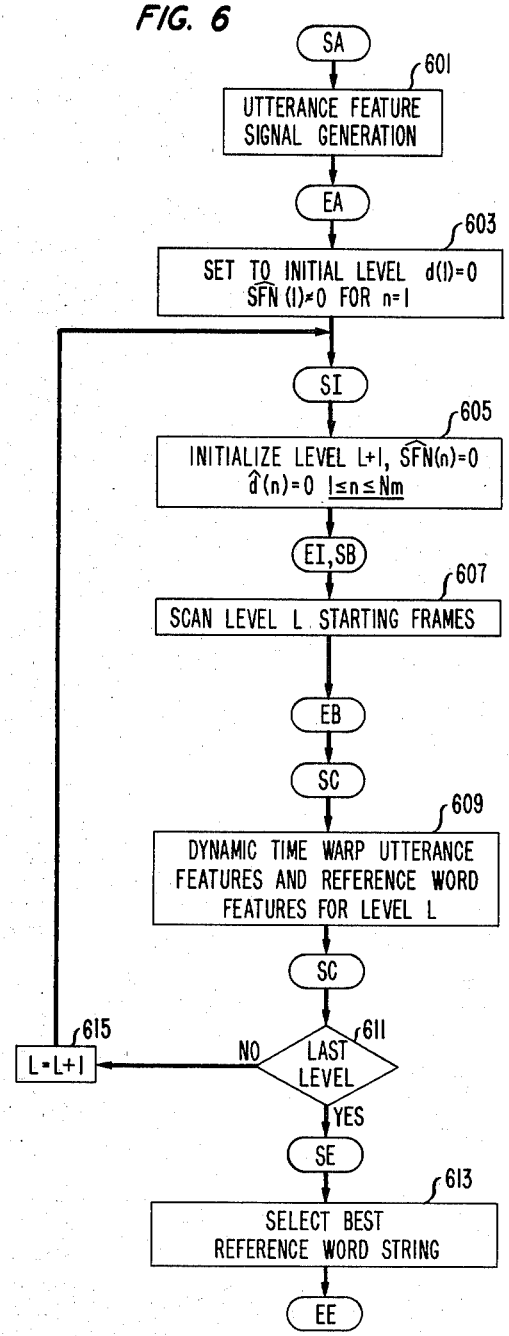
FIG. 6 shows a general flow diagram illustrating the speech recognition process according to the invention.

FIG. 1 illustrates graphically the level building recognition process for a speech pattern consisting of the four word spoken binary number sequence 1001. The flow diagram of FIG. 6 shows the sequence of operations of the level building arrangment. After storage of the acoustic feature signals for each reference word i.e., 0 and 1, the analysis of the utterance indicated in operation box 601 is performed. In the analysis step, the sequence of acoustic features corresponding to the input utterance are produced. The word level is then initially set to level $L=0$ (box 603) for which there is a single utterance starting frame $n=1$.

The first level processing is started by initializing the storage for distance signal and starting frame signals of level $L+1=1$ in accordance with operation box 605. The first level in FIG. 1 extends from abscissa 150 to line 160 which lines correspond to the beginning and ending frames of the reference words in level $L=1$. The end of Level $L=0$ corresponding to abscissa 150 is scanned (box 607) to detect the first starting frame therein. After detection of starting frame $n=1$ in the scan, the dynamic time warping of utterance features to reference word features for level $L+1=1$ is begun according to operation box 609.

In the time warp processing step, the feature signals of reference word "zero" from reference word frame $m=1$ to frame $M_0{}^1$ are first dynamically time warped to the utterance feature signals beginning at utterance frame $n=1$. In this manner the permissible paths in the region bounded by lines 101, 104, and 160 representing the utterance pattern segment for the first level are generated. Paths 110-1 and 110-2 having endpoints $n_1{}^1$ and $n_2{}^1$ are determined as shown in FIG. 1. The endpoints for these paths as well as the cumulative distance correspondences along these paths and the reference word identification signal zero are stored. Paths ending at endpoint $n_3{}^1$ may also be determined for reference word "zero." These paths, however, have cumulative distances greater than those obtained later for reference word "one."

Subsequently, the feature signals of reference word "one" from frames $m=1$ to $M=M_1^1$ are dynamically time warped to the utterance feature signals starting at utterance frame $n=1$. Paths 110-3, 110-4, 110-5, and 110-6 are generated for reference word 1 as shown in FIG. 1. The endpoints of these paths $n_3^1$, $n_4^1$, $n_5^1$, and $n_6^{-1}$ are stored with the cumulative path distances and the reference word identification signal one. Paths having endpoints $n_1^1$ and $n_2^1$ may also be obtained for reference word "one." However, only the path to an endpoint with the minimum cumulative distance is shown in FIG. 1. Where a path for reference word "zero" and a path for reference word "one" terminate at the same endpoint, the lesser cumulative distance path is selected. Thus, only reference word "zero" paths ending at points $n_1^1$ and $n_2^1$ are retained while only reference word "one" paths ending at points $n_3^1$ through $n_6^1$ are retained. In this manner, all possible combinations of reference word features signals for the utterance are evaluated. Upon termination of the dynamic time warping for level $L+1=1$, the level L is compared to the maximum level ($L_{max}=4$) as shown in decision box 611. As a result of the comparison, the level is incremented from $L=0$ to $L=1$. Box 605 is reentered via decision box 611 so that level $L+1=2$ distance and starting frame storage is initialized. The scan for the first starting frame of level $L=1$ in box 607 results in detection of frame $n_1^1$ as the initial starting frame for the level $L+1=1$ dynamic time warping.

In the second level DTW processing (box 609), the sequence of reference word feature signal frames are between lines 160 and 170. Only DTW processing paths in the region bounded by speech pattern segment lines 160, 101, 170, 103, and 104 are permitted. The starting frames for the second level processing correspond to the ending frames of the first level paths to maintain continuity. The feature signals for the reference word zero beginning on line 160 are dynamically time warped to the feature signals of the utterance beginning at utterance frame $n_1^1$. As indicated in FIG. 1, DTW paths 120-5, 120-7, 120-8, 120-9, and 120-10 among others are generated. The ending frames for these paths $n_5^2$, $n_7^2$, $n_8^2$, $n_9^2$ and $n_{10}^2$ are stored together with the cumulative distances to these endpoints from the beginning point of the utterance as well as the zero reference word identification signal and the second level ($L+1=2$) starting frames for the determined paths.

The feature signals of the reference word "one" between lines 160 and 170 are then time warped to the utterance feature signals beginning at frame $n_1^1$ to determine the second level paths for reference word "one." Paths 120-1, 120-2, 120-3, 120-4, and 120-6 among others are constructed. For ending frames of these paths, $n_1^2$, $n_2^2$, $n_3^2$, $n_4^2$, and $n_6^2$, the cumulative distances from the beginning frame of the utterance, the identifying signal for reference word one, and the frames along line 160 from which the paths are initiated are stored. Upon termination of the second level ($L+1=2$) time registration processing (operation box 609), all two-word partial strings within the permitted region have been evaluated and the signals defining the possible candidate strings are stored. Decision box 611 is reentered. Since last level $L_{max}=4$ has not been processed, the level L is incremented to 2 (box 615).

Box 605 is now entered and the storage for the next level $L+1=3$ is initialized. Level $L=2$ is then scanned (box 607) to detect endframe $n_1^2$ as the initial starting frame for the third level ($L+1=3$) time registration processing. During the third level processing (box 609), the reference word feature signals are repeated at the third level between line 170 and line 180. The dynamic time warping of the reference word feature signals to the utterance feature signals beginning at utterance frame $n_1^2$ on line 170 results in best distance paths 130-1, 130-3, 130-4, 130-5, and 130-6 for reference word zero and the best distance paths 130-2 for reference word one. The other possible paths from the starting frames on line 170 are invalid as falling outside the region defined by line 170, line 101, line 102, line 180 and line 103 or as having cumulative distances that are too large for consideration. With the storage of the cumulative distance signals, reference word identification signals, and starting frame signals for the permitted endpoints, all possible strings of three reference words are identified at the termination of the third level.

Decision box 611 is entered again and, as a result, the level index is changed to $L=3$ in index box 615. As aforementioned with respect to the preceding level processing, the distance signal and frame storage for level $L+1=4$ is initialized in operation box 605. The stored frame signals for level $L=3$ are scanned as per operation box 607 and the starting frame $n_1^3$ is selected as the first frame for the dynamic time warping of level $L+1=4$. The fourth level DTW processing is then performed as indicated in operation box 609.

As shown in FIG. 1, the fourth level dynamic time warping between the reference word feature signals and the utterance feature signals results in a single path 140-1 between utterance frame $n_5^3$ on line 180 and utterance endframe $N_1$ on line 190. After the fourth level DTW processing, the intersection of a dynamic time warping path with the utterance endframe N is detected and the level processing is terminated in decision box 611. Operation box 613 is entered and the best reference word string is reconstructed from the stored level data. Thus in FIG. 1, the stored level endpoints $n_5^3$, $n_9^2$, and $n_5^1$ permit backtracking the paths 140-1, 130-5, 120-8, and 110-5 through levels 4, 3, 2, and 1. In this manner the binary sequence 1001 is selected as the input utterance. Where in any level more than one path terminates on the utterance final frame $N_m$, the closest corresponding reference word string may be selected by a comparison of the cumulative distances for the possible time registration paths in FIG. 1. Alternatively, the reference word string having a particular number of digits is selected.

The region of allowable registration paths in the example illustrated by FIG. 1 is fixed to accommodate only utterances of a prescribed number of connected words by matching the utterance final frame $N_m$ to the last reference word endframes on line 190. This arrangement may be easily modified to accommodate utterances of fewer words by extending the allowable region to include an extreme point for each level falling above the minimum speech rate boundary line 104. In FIG. 1, utterances can be processed with reference word strings of two or three words by enlarging the dynamic time warping region to the dashed line extensions of lines 104, 170, and 180 and dashed line 105. The extended region permits recognition of different length connected word utterances with the limitation that the maximum number of words in an input utterance is prescribed.

In the example illustrated in FIG. 1, the endpoint of the fourth level path 140-1 intersected the line defining the endframe N of the utterance. Such a requirement may unduly restrict the selection of candidate reference word strings. An arrangement in which an ending range of several frames is defined allows for some margin of error in the determination of the ending frame of the input utterance. Thus in FIG. 1, an ending range between lines 192 and 194 may provide an appropriate utterance endpoint region. Line 102 is shifted to dotted line 109 to accommodate the larger range of utterance final frames.

As is well known in the art, the time registration of connected word speech patterns with concatenations of isolated reference word patterns generally results in errors due to coarticulation in the connected word speech pattern. These errors are attributable to mismatches in the beginning and ending regions of words since the reference words are generally elongated when spoken in isolation. The arrangement exemplified by FIG. 1 may be modified to account for such coarticulation by permitting the selection of the best matching starting and ending frames at the boundaries of each level. Thus, the time registration arrangements close to the level boundaries are adjusted to accommodate coarticulation effects.

The utterance starting frames at each level of FIG. 1 correspond to the ending frames produced in the preceding level and are independent of the magnitudes of the accumulated distances associated with the preceding level endpoints. The recognition arrangement may be modified to further reduce signal processing requirements by limiting the starting frames in accordance with a prescribed range of the best average cumulative distance determined in the preceding level processing. The accuracy of the resulting recognition is substantially unaffected by such a restriction since only the least likely candidates are removed from consideration.

DETAILED DESCRIPTION

Figure 2:
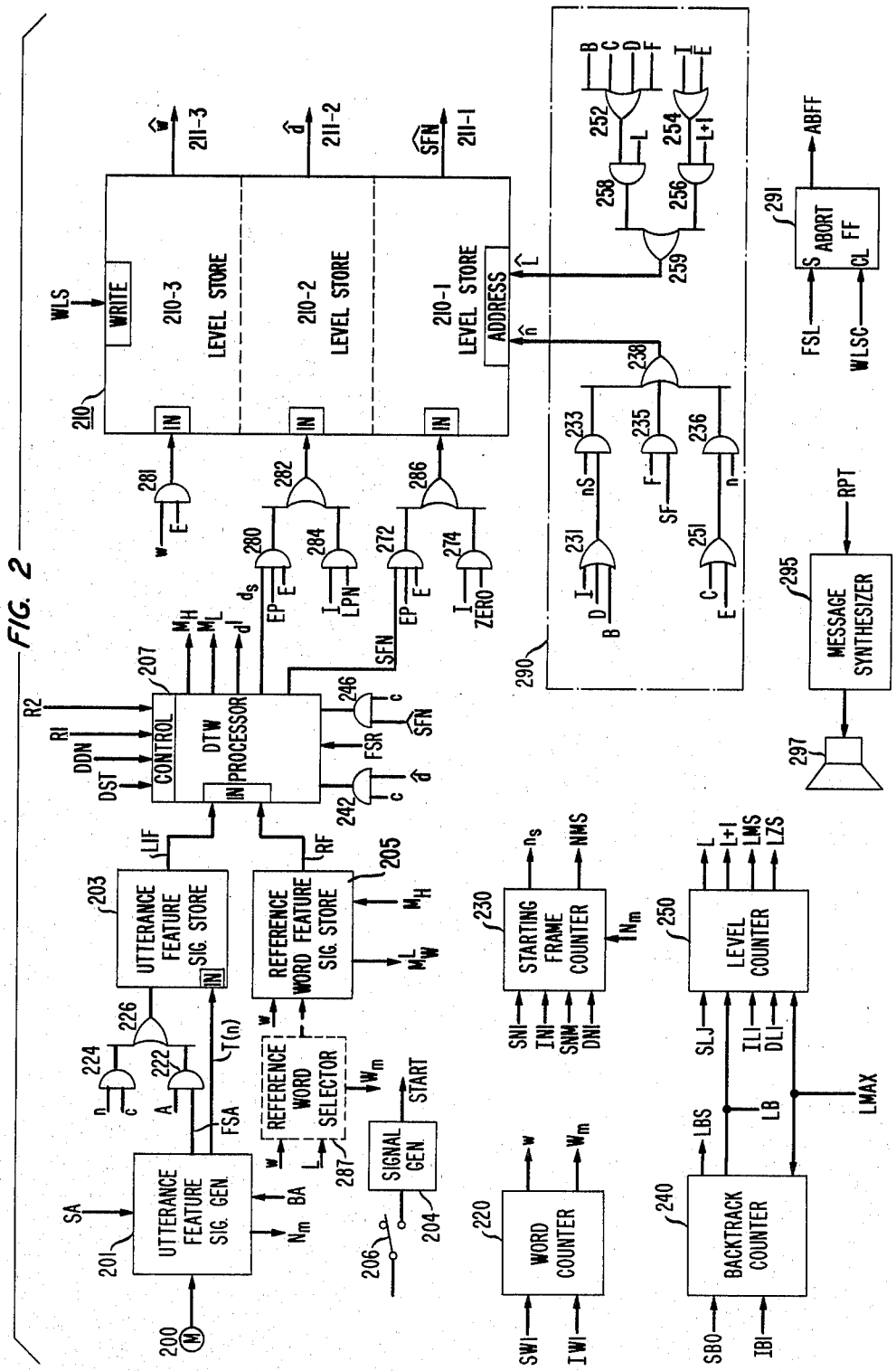
FIGS. 2 and 3 depict a block diagram of a speech recognizer circuit illustrative of the invention.
Figure 3:
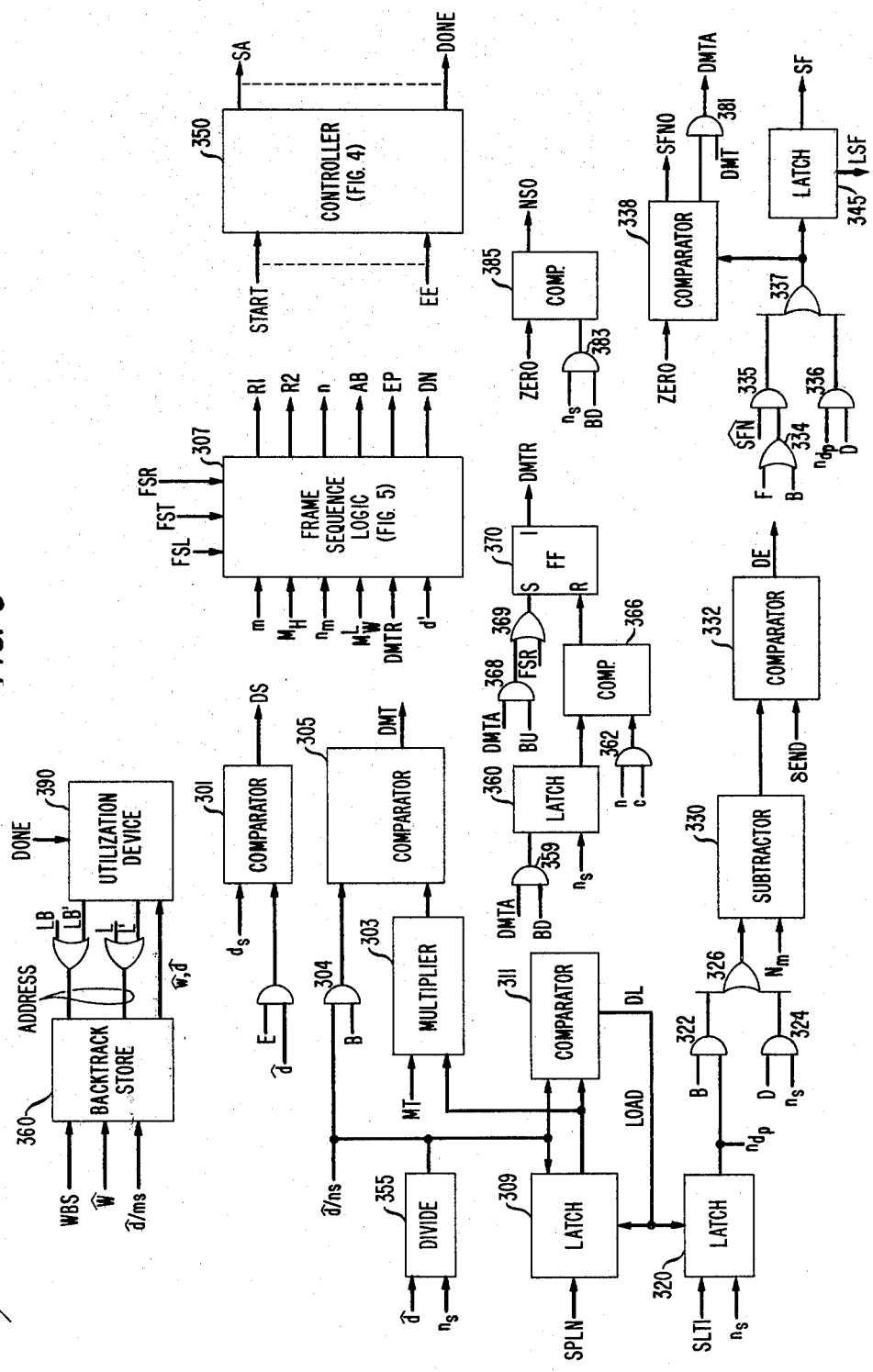

FIGS. 2 and 3 show a detailed block diagram of a continuous speech recognizer illustrative of the invention. In FIG. 2, reference word feature signal store 205 which may be the Texas Instruments, Inc. type 74S287 programmable read only memory integrated circuit is adapted to store a plurality of template signals. Each template signal is representative of the sequence of acoustic features of a reference word. These acoustic features are derived from isolated utterances of the word by means of a linear predictive analysis well known in the art. While linear predictive parameters are used as feature signals in the circuit of FIGS. 2 and 3, it is to be understood that other acoustic features such as spectral or formant parameters may also be used with the invention. The utterance of each reference word is divided into M frames and a $(p+1)^{st}$ order feature vector signal is produced for each frame. The feature vector signal corresponds to the autocorrelated linear prediction coefficients of the frame speech signal. The reference word template is then represented by the signal of Equation 1. The template signals for the reference words $w_1, w_2 \ldots w_m$ are stored in feature store 205 and are addressed by template word number signal w from word counter 220 which may comprise type 74163 binary up/down counters. It is assumed for purposes of illustration that the recognizer of FIGS. 2 and 3 is adapted to recognize sequences of spoken numbers. Consequently, the reference word set consists of the digits zero through nine.

Utterance feature signal generator 201 in FIG. 2 is conditioned to receive a speech signal from electroacoustic transducer 200 and to convert the received utterance into a sequence of acoustic feature signals of the same type as stored in reference feature signal store 205. A linear prediction coding analysis is performed on each frame of the speech signal from transducer 200 to form a $(p+1)^{st}$ order feature vector signal for the frame. The sequence of utterance feature signals of Equation 2 are obtained from the analysis. These feature vector signals T(n) are sequentially transferred to utterance feature signal store 203 (a plurality of type 74S207 Random Access Memories) wherein they are stored frame by frame. Utterance feature generator 201 may be the Linear Prediction Coefficient Generator described in U.S. Pat. No. 4,092,493 issued to L. R. Rabiner and M. R. Sambur, May 30, 1978, or may comprise other LPC generation apparatus well known in the art.

The time registration processing is performed in DTW processor 207 for each level responsive to the utterance features from store 203 and the reference word features from store 205. The cumulative distance signals $d_s$ generated in processor 207 are inserted into section 210-2 of level store 210 which may comprise a plurality of type 74S207 Random Access Memories. The level store is addressed jointly by utterance frame number $\hat{n}$ and level $\hat{L}$. Section 210-1 stores the starting frame numbers SFN obtained from DTW processor 207 in the dynamic time warping processing. Section 210-3 stores the reference word identification signals w associated with the processing. The processing results addressed by signals $\hat{n}$ and $\hat{L}$ are made available as starting frame signal $S\hat{F}N$, cumulative distance signal $\hat{d}$, and reference word identification signal $\hat{w}$ on lines 211-1, 211-2, and 211-3 respectively.

Frame sequence logic 307 in FIG. 3 provides the sequence of utterance frames n that controls the readout of utterance feature signals from store 203 and also generates control signals to determine the operation of DTW processor 207. Backtrack store 260 in FIG. 2 is rendered operative upon completion of the last level processing to store the DTW paths determined in the level processing so that the closest corresponding reference word string may be selected.

For purposes of illustration, it is assumed that the speech recognizer of FIGS. 2 and 3 is used to identify an utterance consisting of a sequence of spoken numbers having a maximum length of five digits. It is to be understood, however, that the speech recognizer arrangement may be utilized to recognize spoken words or phrases of any character and of length other than five words. The utterance selected for illustration is the digit sequence "4453" extending over 128 frames. Prior to the application of the utterance to electroacoustic transducer 200, signal START is produced by signal generator 200 under control of an external device such as switch 206.

Figure 4:
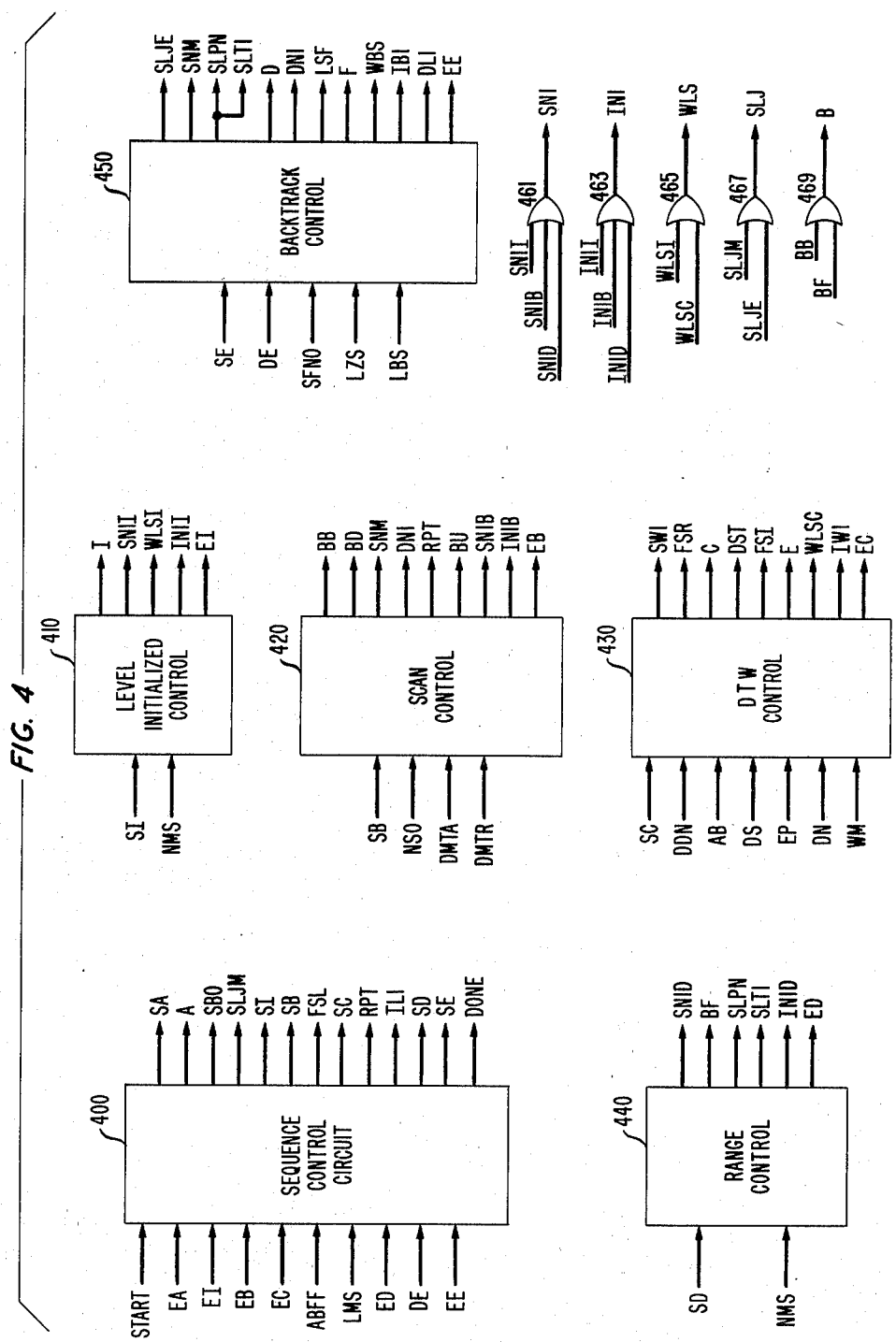
FIG. 4 shows a detailed block diagram and controller useful in the circuit of FIGS. 2 and 3.

The START signal is applied to controller 350 which is shown in greater detail in FIG. 4. The controller of FIG. 4 comprises sequence control circuit 400 adapted to determine the general sequencing of the operations of the recognizer circuit of FIGS. 2 and 3 and controllers 410, 420, 430, 440, and 450 adapted to determine an individual operation mode selected by sequence control circuit 400. Each control circuit in FIG. 4 is a microcomputer well known in the art such as described in the article "Let A Bipolar Processor Do Your Control and Take Advantage of Its High Speed" by Stephen Y. Lau appearing on pages 128–139 of *Electronic Design*, 4, Feb. 15, 1979. As is well known in the art, a controller of this type produces one or more selected output signals responsive to the states of the signals applied thereto. Every control circuit incorporates a read only memory in which there is a stored set of instructions adapted to direct its operation sequence. The instructions for sequence control circuit 400 is shown in FORTRAN language in Appendix A. Similarly, the instructions for controllers 410, 420, 430, 440, and 450 are shown in Appendices B, C, D, E and F, respectively.

Signal START from generator 204 is supplied to sequence control circuit 400 which generates control pulse SA and control signal A responsive thereto. Control pulse SA is applied to utterance feature signal generator 201 in FIG. 2 and conditions generator 201 to produce a sequence of utterance feature vector signals T(n) and frame addressing signals FSA responsive to the speech pattern signal from transducer 200. The frame addressing signals are transferred to the address input of utterance feature signal store 203 via AND-gate 222 and OR-gate 226 while control signal A is enabling.

Figure 7:
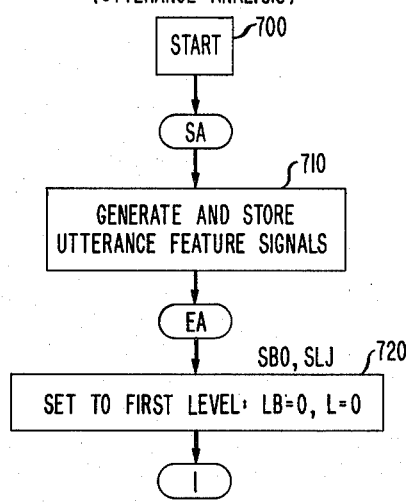

The flow diagram of FIG. 7 illustrates the utterance analysis operation. When signal START obtained as indicated in box 700, control pulse SA is produced and the utterance feature signals are generated and stored as in operation box 710. Upon completion of the utterance analysis and the storage of the feature signals in store 203, control pulse EA is produced by generator 201 and the utterance endframe $N_m = 128$ is transferred from generator 201 to frame counter 230. Sequence control circuit 400 in FIG. 4 generates control pulses SBO and SLJM responsive to pulse EA. These signals are operative to initialize the level processing to the first level as per operation box 720 in FIG. 7. Control pulse SBO is applied to the set input of backtrack counter 240 in FIG. 2 which is thereby reset to its zero state. Pulse SLJM passes through CR-gate 467, and the SLJ signal therefrom is applied to level counter 250. Level counter 250 is thereby reset to its zero state so that the L output therefrom is zero and L+1 output therefrom is one. Counter 250 comprises type 74283 counter circuit, type 74163 adder circuit, and type 7485 comparator circuit in a well known configuration.

Figure 8:
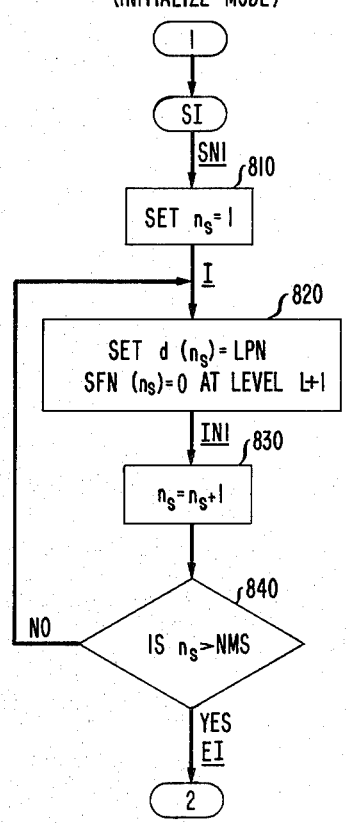

Pulse EA at the termination of the utterance analysis also causes control circuit 400 to generate control pulse SI as shown in the flow chart of FIG. 8. Control pulse SI is operative to condition the recognizer circuit of FIGS. 2 and 3 to enter the first initialization mode in which the level $L+1=1$ storage locations of level store 210 are preset. In this way, level store 210 is initialized prior to the dynamic time warping of the speech pattern feature signals of the first level segment with the first level reference word feature signals. As indicated in box 810 of FIG. 8, the speech pattern frame address for level $L+1=1$ of store 210 is initially set to the first frame $n_s = 1$. The distance signal storage location for the first frame is set to the largest possible number code LPN available in the circuit of FIGS. 2 and 3 and the starting frame location associated with utterance frame $n_s = 1$ is set to zero as per operation box 820. The utterance frame number is incremented (box 830) and operation box 820 is reentered via decision box 840 so that the next utterance frame distance signal and starting frame number location can be preset. The store initialization operation continues until the utterance frame number is greater than the maximum utterance frame $N_m = 128$ at which time control pulse EI is produced.

At the beginning of the initialization, pulse SI from control 400 is supplied to level initialization controller 410. Control signal I produced by control 410 is applied to OR-gate 231 and OR-gate 254 in level store addressing logic 290. Responsive to control signal I, AND-gate 233 is alerted. Similarly, AND-gate 256 is alerted by the output of OR-gate 254. Control pulse SN1I is then generated in control 410 so that signal SN1 is transferred from OR-gate 461 to the reset input of frame counter 230. The frame counter is thereby initialized to its first state wherein the $n_s$ output is set to one. The $n_s = 1$ signal passes through AND-gate 233 and OR-gate 238 so that the $\hat{n} = 1$ utterance frame location of level store 210 is addressed. Level counter 250 was previously reset and the L+1 output therefrom is one. The $L+1=1$ signal passes through AND-gate 256 and Or-gate 259 whereby the $\hat{L} = 1$ level of store 210 is addressed. In this manner, the first utterance frame storage cells of level 1 in store 210 are selected.

Store 210 which may comprise type 745207 Random Access Memories and type 745287 Programmable Read Only Memory integrated circuits is divided into three sections. The time registration path starting frame $\hat{SFN}$ for the selected address is stored in section 210-1. The cumulative distance $\hat{d}$ obtained by dynamic time warping for the addressed frame is stored in section 210-2 and the reference word identification signal $\hat{w}$ obtained from dynamic time warping for the addressed frame is stored in section 210-3.

At the time utterance frame $n_s = 1$ of level $L+1=1$ is addressed in store 210, a zero code signal passes through AND-gate 274 and OR-gate 286 responsive to signal I. The zero signal appears at the information input of store section 210-1. AND-gate 284 alerted by signal I permits the LPN signal to pass therethrough to the information input of store section 210-2 via OR-gate 282. Control 410 is rendered operative to produce signal WLSI and write signal WLS is applied to the write enable input of store 210 via OR-gate 465. A zero code and an LPN code are thereby inserted into locations $\hat{L}=1$, $\hat{n}=1$ of level store sections 210-1 and 210-2, respectively.

Control pulse IN1I is then generated in control 410 and applied to frame counter 230 through OR-gate 463. The frame counter is incremented. Signal $n_s = 2$ obtained therefrom causes the second utterance frame locations of level store 210 ($\hat{L}=1$, $\hat{n}=2$) to be addressed. The next WLS signal from control 410 is operative to initialize the SFN(2) and $\hat{d}(2)$ locations to zero and LPN, respectively. The sequence of IN1I and WLSI pulses from control 410 is repeated at a predetermined rate to preset the utterance frame locations 1 through $N_m$ of level $L+1=1$. The NMS output of frame counter 230 is enabled when its $n_s = N_m$ state is reached. Responsive to the NMS signal from counter 230, control 410 produces control pulse EI which terminates the first level initialization after the $L=1$, $n=N_m$ locations of store sections 210-1 and 210-2 are set to 0 and LPN, respectively.

The dynamic time warping of each level processing is begun at the lowest ending frame of the preceding level after detection and storage of the highest ending frame of the preceding level. Consequently, the $\hat{L}=0$ locations in level store section 210-1 are scanned from frame $n_s = 1$ to detect the first frame in which there is a nonzero valued starting frame. Level $\hat{L}=0$ corresponds to the beginning of the utterance and has a single nonzero valued starting frame $\hat{SFN}=1$ for frame $n_s=1$. In level store 210, the L=0 entries are fixed and are provided in a read only memory portion. The $n_s=1$ location of section 210-1 is permanently set to $\hat{SFN}=1$ and the corresponding location in section 10-2 is permanently set to $\hat{d}=0$. All other frame locations for level L=0 in section 210-1 are permanently set to $\hat{SFN}=0$ and all other locations in section 210-2 are set to $\hat{d}=LPN$.

The scanning mode is started responsive to pulse EI from control 410 which pulse causes sequence control circuit 400 to generate control pulse SB. Responsive to pulse SB, scan control 420 produces signal BB that is applied via OR-gate 469 as signal B to OR-gates 231 and 252 in level store addressing logic 290 for the duration of the scan. The output of OR-gate 231 alerts AND-gate 233 so that the sequence of $n_s$ scanning address signals from frame counter 230 may be applied via OR-gate 238 to the $\hat{n}$ address input of level store 210. The output of OR-gate 252 alerts AND-gate 258 whereby the L=0 signal passes through AND-gate 258 and OR-gate 259 to be applied to the L address input of level store 210.

Scan control 420 also produces pulses BD and SNM at the start of the scan mode. The SNM pulse sets frame counter to the utterance endpoint ($n_s=N_m$) state as per index setting box 910 in FIG. 9. Address logic 290 then selects the $n_s=N_m$ frame of level L=0 and the $\hat{SFN}=0$ and $\hat{d}=LPN$ signals for frame $N_m$ are supplied to gate 335 and divider 355, respectively. The $\hat{SFN}=0$ signal is applied to one input of comparator 338. Responsive to the $\hat{SFN}=0$ signal, comparator 338 remains disabled. Consequently, signal DMTA at the output of AND-gate 381 remains disabled (operation box 912). Scan control 420 then produces pulse DN1 which decrements frame counter 230 in accordance with operation box 914. Signal NSO remains disabled for $n_s=N_m$ (operation box 916). The $n_s$ signal is compared to zero in comparator 385 when signal BD is present. In this way, frame counter is repeatedly decremented until $n_s=1$.

The $\hat{SFN}=1$ signal for $n_s=1$ enables the output of comparator 338. The $\hat{d}$ signal for L=0, $n_s=1$ from section 210-2 of level store 210 is zero. Divider 335 forms the signal $\hat{d}(1)/1=0$ which signal is compared in comparator 305 to the LPN signal previously stored in latch 309. Signal DMT is enabled and gate 381 provides an enabled DMTA signal to latch 360 via AND-gate 359. The $n_s=1$ signal is thereby placed in latch 350 (operation box 920). The DMTA signal is also applied to control 420 which disables signal BD and enables signal BU. Scan control 420 now provides signal SN1B which passes through OR-gate 461 as pulse SN1 to reset frame counter 230 to its initial $n_s=1$ state (operation box 922). In this way the $n_s=1$ utterance frame locations of level L=0 in store 210 is selected. The distance signal for the selected frame location from level store section 210-2, $\hat{d}=0$ is then available on line 211-2 from which line it is supplied to one input of comparator 305 in FIG. 3 via divider 335 and gate 304. The other input of comparator 305 from multiplier 303 is greater than zero at this time and signal DMT from comparator 305 is enabled. The enabled DMT signal is applied to gate 381. Since the $\hat{SFN}=1$ signal from store section 210-1 is present at comparator 338, signal DMTA is enabled and latch 370 is set via AND-gate 368. Scan control 420 then produces control pulse EB responsive to signal DMTR from latch 370. Signal EB terminates the scan operation. The EB pulse, in turn, causes sequence controller 400 to produce pulses FSL and SC.

The FSL pulse is applied to frame sequence logic 307 so that the current SFN code ($n_s=1$) from level store section 210-1 is inserted into frame sequence logic 307. In this way, the dynamic time warping for the first level is initiated at frame n=1. The SC pulse causes DTW control 430 to generate the control signal sequence that conditions the circuit of FIGS. 2 and 3 to perform the dynamic time warping of the first level speech pattern segment feature signals to the first level reference word feature signals from utterance frame SFN=1.

The flow diagram of FIG. 10 illustrates the level dynamic time warp arrangements of the invention. As aforementioned, the dynamic time warp processing is operative to determine the time registration path endpoints for the level L=1 and to cause the cumulative distance signals, the best reference word identification signals, and the starting frame signals for these endpoints to be stored in level store 210. In FIG. 10, a flag is initially set as per box 1001 which flag is reset upon detection of a valid level endframe. The first reference word $w_0$ (zero) is selected in box 1005 and the initial frame for the dynamic time warping is set to the starting frame SFN=1 determined in the immediately preceding scan mode (box 1010). The initial frame of reference word zero is frame n=1. The dynamic time warping of the speech pattern segment feature signals to the reference word feature signals of box 1015 is then started.

The DTW processing is performed following the general procedure shown in Equation 7. In accordance with the invention, the reference word frames of each level are divided into three segments, an initial segment $\delta R1$, a terminal segment $\delta R2$, and the segment intermediate the initial and terminal segments. As aforementioned with respect to Equation 7, the permissible reference word frames are selected to conform to possible acoustic conditions. In the intermediate segment of a level, the speech rate restrictions of Equation 7 are followed. The reference word acoustic features in store 205 are derived from utterances of the word spoken in isolation. Adjacent words in the connected word speech pattern are generally coarticulated. Consequently, the range of reference word frames is adjusted in the initial and terminal segments to account for the coarticulation. In the initial segment, the choice of reference frames for the final term of Equation 7 is extended over the range of frames of $\delta R1$. For segment $\delta R1$, $I_2$ is m and $I_1$ is one if $w(n-1)=w(n-2)$ or zero otherwise. Similarly in the terminal segment the choice of frames is extended over the region $\delta R2$. In segment $\delta R2$, $I_1$ is one if $w(n-1)=w(n-2)$ and zero, otherwise reference word ending frame $m_w{}^L$ and $I_2$ is $\delta R2-M_w{}^L$. In this way, the time registration of utterance features to reference features is made more accurate in the presence of coarticulation. Typically, $\delta R1=4$ and $\delta R2=6$ for speaker trained reference feature signal templates. The $\delta R1$ is set to zero and $\delta R2=4$ for speaker independent reference patterns.

The dynamic time warping of operation box 1015 dynamic time warping is performed over the range of reference word frames $1 \leq m \leq M_w{}^L$ for each successive utterance frame n. The frame selection of the dynamic time processing operations performed in DTW processor 207 is controlled by frame sequence logic 307 shown in greater detail in FIG. 5.

In the embodiment illustrated in FIGS. 2-5, DTW processor control 430 provides control pulses SW1 and FSR as well as control signal C responsive to pulse SC from sequence controller 400. Word counter 220 in FIG. 2 is reset to its $w=w_0$ state by pulse SW1. The FSR pulse resets counter 505 to its initial state. Counter 505 stores the number of utterance frames of the level already processed. The utterance starting frame inserted into latch 501 is transferred to counter 503 by pulse FSR. The n output of counter 503 provides the input speech pattern frame signal for the DTW processing. The FSR signal also sets flip-flop 370 via OR-gate 369. The DMTR signal is thereby enabled at the beginning of each DTW scan.

Figure 5:
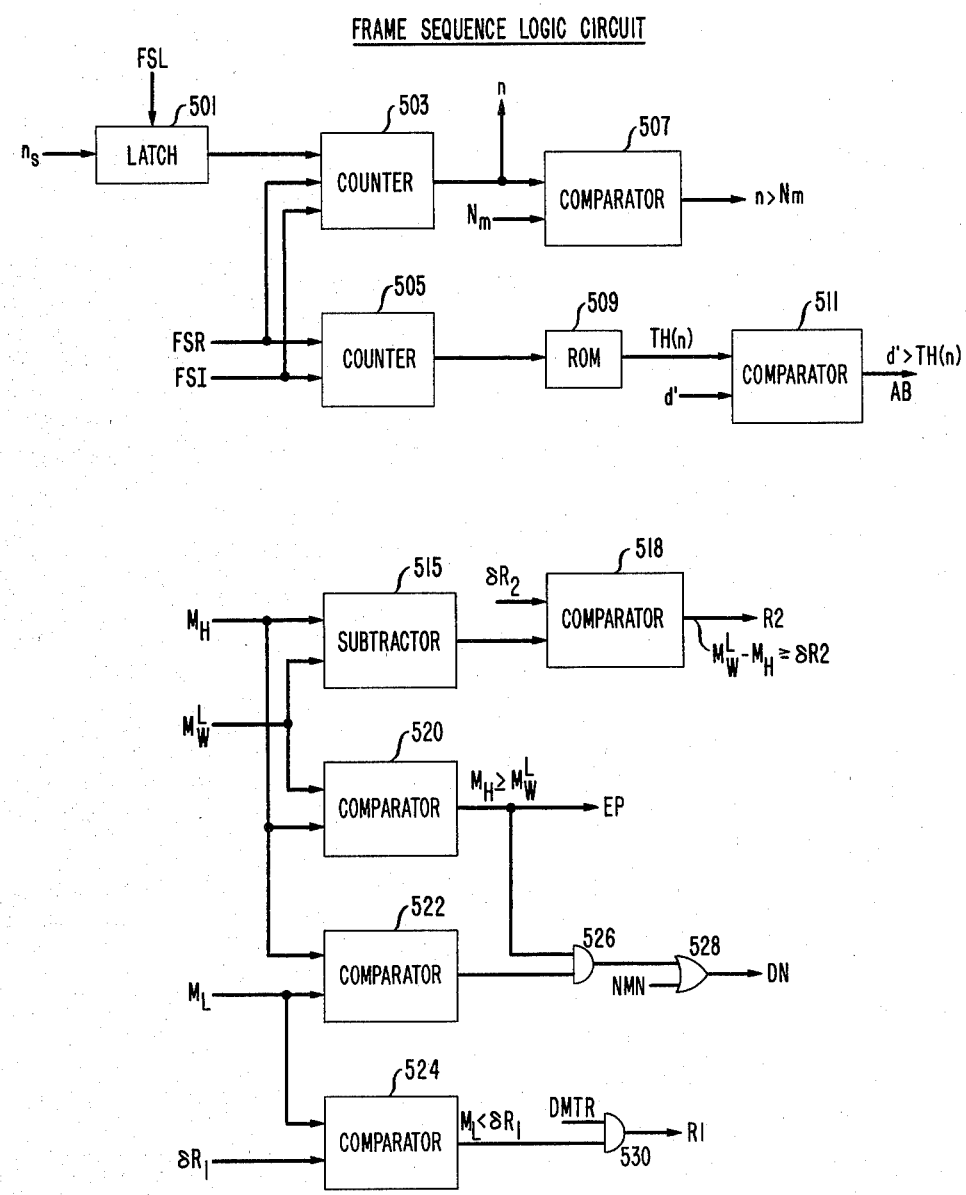
FIG. 5 shows a detailed block diagram of a frame sequence logic circuit useful in the circuit of FIGS. 2 and 3.

Signal C from control 430 is applied to OR-gates 251 and 252 of level store address logic 290. Frame signal ñ from counter 503 then passes through AND-gate 236 to the n address input of store 210. AND-gate 258 is responsive to the output of OR-gate 252 to pass level signal L from level counter 250 to the L address input of store 210. At the beginning of the DTW processing for the level, the initial speech pattern segment frame from counter 503 of FIG. 5 provides the speech pattern segment frame addressing signal n for utterance feature signal store 203 via AND-gate 224 and OR-gate 226. The speech pattern feature signals corresponding to frame signal n are supplied to the input of DTW processor 207. DTW processor 207 is initially preconditioned to provide the first reference word frame signal at its range lower limit output ($M_L$). This $M_L=1$ signal is supplied to comparator 524 in FIG. 5 which is adapted to detect whether the processing is in the initial segment of the level, $\delta R1$. Typically $\delta R1$ is set to four frames. For $1 \leq M_L \leq \delta R1$, the output of comparator 524 is enabled and signal R1 is obtained from AND-gate 530 if the current utterance frame is an ending frame of the preceding level and the signal DMTR from flip-flop 370 is enabled. The DMRT signal is present when the speech segment frame are within the range of endframes of the preceding level. This, then is continuity of dynamic time warping paths from level to level.

The DTW processing is initiated by control pulse DST from DTW control 430. Reference word frame signal $M_H$ from processor 207 is used to address reference word feature signal store 205 so that reference features of the required frames for the selected word w are supplied to the DTW processor in accordance with Equation 7. When reference word frame signal $M_L$ exceeds $\delta R1$, the output of comparator 524 is disabled and signal R1 is removed from the DTW processor. Consequently, the restrictions on the DTW processing of Equation 7 are changed to conform to the acoustical conditions for the intermediate segment.

Reference word endframe signal $M_w^L$ from store 205 corresponds to the ending frame of the addressed reference word and is supplied to subtractor 515 and comparator 520 in the frame sequence logic circuit of FIG. 5. Signal $M_H$, the upper limit of the reference word frame range in the dynamic time warping in progress, is supplied from processor 207 to subtractor 515 and comparator 520. When the difference signal $M_w^T - M_H$ from subtractor 515 is equal to or less than the $\delta R2$ signal corresponding to the terminal segment of the level, the output of comparator 518 (R2) is enabled. Signal R2 is applied to one of the control inputs of processor 207 so that the dynamic time warping restrictions are changed to accommodate the terminal segment of the level processing.

During the operation of processor 207, signal d' representative of the distance between the current reference word features and the speech pattern segment features up to frame (n) of the level is compared to a threshold value T(n) as indicated in decision box 1020 of FIG. 10. Threshold T(n) is the output of Read Only Memory 509 and set at the largest distance signal expected for a valid candidate reference word at the current frame. In the event distance signal d' from processor 207 exceeds threshold T, the distance processing for the reference word is aborted. Index box 1050 is entered and the next reference word is selected. Decision box 1055 is then entered to determine whether all reference words for the level have been processed. If there are unprocessed reference words dynamic time warping is restarted as per box 1015 after the utterance frame for the processing is reset to the starting frame determined in the preceding scan operation (box 1010).

Referring to FIGS. 2 and 5, signal d' from DTW processor 207 is supplied to one input of comparator 511 in which the threshold decision of box 1020 is performed. As aforementioned, counter 505 is reset to one at the beginning of the distance processing by signal FSR. Counter 505 is incremented by signal FSI after a speech segment frame n has been processed in box 1015. The frame output of counter 505 addresses ROM 509 and the maximum distance threshold signal T(n) from the ROM is supplied to the other input of comparator 511. If signal d'(n) exceeds the threshold signal assigned to the frame in ROM 509, the abort signal AB from comparator 511 is enabled and applied to control 430. Control 430 then is operative to generate an IW1 pulse which increments word counter 220 in FIG. 2 and an FSR pulse which resets counter 505 and transfers the frame signal in latch 501 to counter 503. The circuit of FIGS. 2 and 3 is thereby conditioned to perform the level DTW processing for the succeeding reference word.

In the first level processing for the input utterance 4453, the speech pattern segment beginning at frame $n=1$ is first dynamically time warped to the reference word "zero" in processor 207. The first level processing for all reference words except "four", however abort without generating time registration paths because of the dissimilarity of the reference feature signal with the first word speech pattern segment feature signals. During the DTW processing for reference word "zero", a distance signal d'(n) exceeds threshold signal T(n) prior to detection of a DTW registration path endpoint. Signal AB from comparator 511 is enabled and responsive to signal AB, DTW control 430 in FIG. 4 generates control pulses IW1 and FSR. The IW1 pulse increments word counter 220 in FIG. 2 and output w therefrom addresses the feature signals for the reference word "one" in store 205. Pulse FSR resets counter 505 to its initial state and causes the frame signal in latch 501 to be transferred to counter 503. In this way, the dynamic time warping of the initial segment of the speech pattern to the reference word "one" is started. During the DTW time registration for reference word "one," comparator 511 is enabled again and the processing is aborted without reaching a time registration endpoint. The dynamic time warping of reference words "two" and "three" also result in abort signals AB because the distance signals d' from processor 207 exceed the threshold signal T(n) from ROM 509 prior to the generation of a time registration path endpoint.

After the DTW processing for reference word "three" is terminated, DTW controller 430 generates pulses FSR and IW1. The IW1 pulse increments word counter 220 so that the feature signals for reference word "four" in store 205 are addressed. Pulse FSR resets counter 503 to the initial DTW processing frame $n=1$ in latch 501 and resets counter 505 to one. The frame signal $n=1$ is then applied from counter 503 to utterance feature store 203 and to level store 210. The feature signals of the utterance segment for level 1 are then made available to DTW processor 207 as addressed by counter 503 and level store 210 is conditioned to receive the time registration path results for reference word "four."

Processor 207 is then adapted to time warp the feature signals of the selected reference word (four) for frames $1 \leq m \leq M_4^L$ to the feature signals of the utterance for the frame n stored in counter 503. The time warping for frame $n=1$ is started responsive to signal DST from control 430.

DTW processor 207 may comprise an arrangement such as described in the *Microproducts Hardware System Reference* published by Data General Corporation, Westboro, Mass., and copyrighted by Data General Corporation, 1979, or other processor systems well known in the art. Processor 207 may include the Micro Nova MP100 system processing unit, the MP1100 4K/8K Dynamic Random Access Memory, the MP/100 8K Programmable Read Only Memory, and one or more model 4222 digital I/O interface units. The operation sequence of processor 207 is determined by the permanently stored instructions in the read only memory thereof. These intructions are listed in FORTRAN language form in Appendix G. Processor 207 operating in accordance with the permanently stored instructions of Appendix G performs the dynamic time warping operations of Equation 7 for each speech pattern segment frame n. Each frame time registration operation is started by signal DST. The selection of reference word frames for the time registration is in accordance with Equation 7 as modified responsive to signals R1 and R2.

Processor 207 provides signal d' corresponding to the path distance of the current level for frame $n=1$, signal $M_I$ corresponding to the lower limit reference word frame, signal $M_H$ corresponding to the upper limit reference word frame, signal SFN corresponding to the starting frame of the registration path, and signal $d_s$ corresponding to the cumulative distance of the time registration path from the utterance segment starting frame.

At the end of the DTW operation of processor 207 for frame $n=1$, signal DDN is applied therefrom to DTW control 430. The d' signal from processor 207 is compared to the T(n) signal for frame 1 from ROM 509 in comparator 511. For $d'(1) < T(1)$, the AB output of the comparator is disabled. At this time, the upper limit reference word frame of the time warping $M_H$ is output from processor 207 and is compared to the reference word $w_4$ ending frame $M_4^L$ from store 205 in comparator 520. The EP output of comparator 520 remains disabled since $M_H < M_4^L$. Responsive to signal DDN and disabled signals EP and AB, control 430 produces signal FSI which increments counters 503 and 505 to their $n=2$ states and also produces signal DST to start the $n=2$ frame DTW operation in processor 207.

In the flow diagram of FIG. 10, decision box 1020 is used to compare d' to T(n) in each time warp operation and decision box 1025 is entered to compare upper reference frame $M_H$ to reference word endframe $M_w^L$. When a "no" indication is provided by decision box 1025 decision box 1040 is entered. In box 1040, lower limit reference word frame signal $M_L$ is compared to reference word and frame $M_w^L$ and utterance frame n is compared with the utterance endframe $N_M$. If either $M = M_w^L$ or $n \geq N_M$, the end of the speech pattern segment for the level is reached. The time registration operations for the reference word are then terminated in index modification box 1050 as previously described. Otherwise, the speech pattern frame n is incremented in index box 1045.

If the level path distance d'(n) up to and including frame n is less than the threshold T(n) fixed in ROM 509 (decision box 1020) and the upper limit reference frame $M_H$ is equal to or greater than the last reference word frame $M_{w4}^L$ (decision box 1025), a valid time registration path has been determined. The path cumulative distance signal $d_s(n)$ from processor 207 is then compared to the cumulative distance signal $\hat{d}$ previously stored in the $n^{th}$ frame location of the level store. Where $d_s(n) < \hat{d}(n)$, the cumulative distance signal $d_s(n)$ from the processor replaces distance signal $\hat{d}(n)$ in store section 210-2 starting frame signal SFN(n) from the processor replaced signal SFN(n) in store section 210-1. The replacement operation of box 1035 occurs because the last determined path corresponds to a better reference word candidate path ending at frame n. If, however, $d_s(n) \geq \hat{d}(n)$, the previously determined path is the better candidate and decision box 1040 is entered from box 1030.

In the illustrative example, $M_H \geq M_w^L$ at frame $n=29$ of the first level and $d_s(29) = 15.2$ is less than $\hat{d}(29) = \text{LPN}$. Consequently, $\hat{d}(29)$ becomes 15.2 and SFN(29) becomes 1. After the replacement operation of box 1035, the lower limit reference frame $M_L$ from the DTW processor is compared to the reference word endframe $M_w^L$ and the utterance frame n is compared to utterance endframe $N_m$ in decision box 1040 to determine if the limits of the speech pattern segment of the level have been reached. Where lower limit $M_L \geq M_w^L$ or $n \geq N_m$, the level DTW processing for reference word "four" is completed and index box 1050 is entered. Otherwise, the utterance frame is incremented in box 1045 and time warping for the next frame is initiated.

In the circuit of FIG. 2 and 3, the dynamic time warping of the features of reference word "four" to the utterance features for successive utterance frames from $n=1$ are performed in processor 207. At the end of the DTW operation for utterance frame $n=29$, the upper limit reference frame signal $M_H$ from processor 207 is equal to the $M_4^L$ signal from reference feature store 205 signifying that an endpoint has been reached. The $M_H$ and $M_4^L$ signals are applied to comparator 520 which is now enabled. Signal EP from comparator 520 is supplied to DTW control 430. Responsive to signal EP, control 430 disables signal C and enables signal E. Comparator 301 in FIG. 3 is then enabled responsive to the accumulated distance signal $d_s(29) = 15.2$ from processor 207 being less than the accumulated distance signal $\hat{d} = \text{LPN}$ stored for frame 29 in level $L+1=1$ store section 210-2. The SFN output of DTW processor 207 is one corresponding to the starting frame of the first level. The $d_s$ output of the processor is 15.2 corresponding to the cumulative distance until endpoint $n=29$ in level one. The SFN=1 signal is supplied to the input of store section 210-1 via AND-gate 272 and OR-gate 286 and the $d_s = 15.2$ signal is applied to the input of store section 210-2 via AND-gate 280 and OR-gate 282. The $w=4$ output of word counter 220 is applied to the input of level store section 210-3 via AND-gate 281.

Responsive to signal DS being enabled, signal WLSC from control 430 is applied as signal WLS to the write enable input of store 210 via OR-gate 465. In this way, reference word identification signal w=4, cumulative distance signal $d_s$=15.2 and starting frame code SFN=1 are inserted in the $\hat{n}$=29, L=1 locations of level store 210. The WLSC signal also resets abort flip-flop 290. Subsequent to the end of write pulse WLS, control 430 provides pulse FSI to increment counters 503 and 505 in FIG. 5. Signal E is disabled and signal C is enabled. Signal DST from control 430 is sent to processor 207 to start the dynamic time warping for utterance frame n=30.

The dynamic time warping for each of utterance frames 29 through 40 results in endframe generation for the level L+1=1. The termination of the time warping for each utterance frame is indicated by signal DDN from processor 207. The concurrent enabling of ending signal DDN from processor 207, ending frame signal EP from comparator 520 of the frame sequence logic and signal DS from comparator 301 initiates the storage of the ending frame path accumulated distance signal $\hat{d}$, the path starting frame signal SFN, and the reference word identification signal w in level store 210 as described with respect to speech pattern frame 29. The DTW processing of reference word "four" for frames n=29 through n=40 result in time registration paths originating from starting frame SFN=1.

Table 1 lists the word identification signal $\hat{w}$, the cumulative distance signal $\hat{d}$, and the starting frame signals SFN which are stored in level store 210 as a result of the processing of frames n=29 to n=40 for the first level.

TABLE 1

| $\hat{n}$ | $\hat{w}$ | $\hat{d}$ | SFN | $\hat{n}$ | $\hat{w}$ | $\hat{d}$ | SFN |
|---|---|---|---|---|---|---|---|
| 29 | 4 | 15.2 | 1 | 35 | 4 | 14.3 | 1 |
| 30 | 4 | 14.4 | 1 | 36 | 4 | 14.8 | 1 |
| 31 | 4 | 13.1 | 1 | 37 | 4 | 15.1 | 1 |
| 32 | 4 | 12.3 | 1 | 38 | 4 | 15.4 | 1 |
| 33 | 4 | 12.6 | 1 | 39 | 4 | 16.6 | 1 |
| 34 | 4 | 13.3 | 1 | 40 | 4 | 19.1 | 1 |

During the dynamic time warping of the features of reference word "four" and the first level utterance segment for utterance frame n=41, signal d' from processor 207 exceeds the maximum threshold signal developed in ROM 509 without the generation of an endpoint signal EP. Consequently, an abort signal AB is obtained from comparator 511. The abort signal AB causes control 430 to increment word counter 220 by means of pulse IW1 and resets counter 503 to the starting frame stored in latch 501 by means of signal FSR so that the dynamic time warping for reference word "five" is started.

The dynamic time warping of reference word acoustic features to the first level speech pattern segment features in accordance with the flow diagram of FIG. 10 is repeated for reference words, "five," "six," "seven," "eight," and "nine." In the illustrative example, each of the DTW processing for these reference words terminates via decision box 1020 as a result of the dissimilarity between the reference word and utterance feature signals. Thus, table 1 represents the time registration paths determined in the first level DTW processing. Every time the reference word index is incremented in box 1050, decision box 1055 is entered to determine whether the last reference word has been processed. After the processing of the features of the last reference word, the abort flag is inspected in decision box 1060. If the abort flag is reset as in the illustrative example, a valid time registration path has been determined and the level L is incremented as per index box 1065. Where the abort flag remains set, no valid path has been determined for the level. Thus, there is no possible time registration path for the succeeding level. If the first level has no valid path, repeat box 1080 is entered via decision box 1075 and the speaker is signaled to repeat the utterance. Signal RPT is generated by sequence control circuit 400 responsive to signal ABFF from flip-flop 291. The RPT signal causes message synthesizer 295 to produce a synthesized message directing the speaker to repeat the utterance. If in the successing levels, there is no further valid path, the utterance candidates are evaluated on the basis of the already stored path signals. For the utterance 4453 level L is incremented to L=1 and the range setting mode illustrated in the flow diagram of FIG. 11 is entered via decision box 1070.

As previously described, the speech pattern segment selected for time registration in each level can extend over the entire range of ending frames determined for the preceding level. It has been found, however, that ending frames at the extremities of a level speech pattern segment generally have very large cumulative distance signals $\hat{d}$. Consequently, paths generated through these ending points are highly improbable. In accordance with the invention, the range of starting frames SFN for each level is restricted to $$\frac{(dn)}{n} \leq MT(d_p)/n_{d_p}$$

to eliminate these highly improbable paths. MT is a fixed range factor and $d_p/n_{d_p}$ normalized minimum cumulative distance signal obtained in the preceding level processing. In particular, the ending points of a level are scanned after DTW processing of the level to determine the minimum normalized cumulative distance dp/np and the ending point $n_p$ corresponding thereto. The minimum normalized distance value $d_p/n_{d_p}$ is then utilized to restrict the starting-frame range of the succeeding level DTW processing.

The determination of the minimum normalized distance signal and the frame corresponding thereto is illustrated in the flow diagram of FIG. 11 and is accomplished in the circuit of FIGS. 2 and 3 under control of range controller 440. The range setting operations are started in response to signal EC from control 430 which occurs upon the termination of the DTW level processing mode. Responsive to signal EC, sequence controller circuit 400 produces starting pulse SD. Pulse SD, in turn, is applied to range control 440 which initially generates pulse SN1D, pulse SLPN, and control signal BF. The SN1D pulse is supplied via OR-gate 461 to reset starting frame counter 230 so that signal $n_s$=1 as in index setting box 1110 in FIG. 11. Pulse SLPN from control 440 inserts a $d_p$=LPN signal into latch 309 while pulse SLT1 inserts a one signal into latch 320 as per index setting box 1120. OR-gate 469 supplies signal B to address logic 290 in FIG. 2 responsive to signal BF from control 440. Signal B alerts AND-gate 233 via OR-gate 231 and also alerts AND-gate 258 via OR-gate 252. In this way the scan frame output of starting frame counter 230 is supplied as signal n and the level signal L=1 from level counter 250 is supplied as signal L to the address inputs of level store 210.

Comparator 311 is used to compare the normalized cumulative distance output from divider 335, section 210-2, $\hat{d}(n_s)/n_s$ to the output of latch 309 $(d_p/n_{dp})$ as in decision box 1130. Divider 335 may comprise the Advanced Micro Device type AM 9511 arithmetic processing unit integrated circuit. In the event that the $\hat{d}(n_s)/n_s$ signal is less than the $d_p/n_{dp}$ output of latch 309, the DL output of comparator 311 is enabled. Signal $\hat{d}(n_s)/n_s$ from store section 210-2 is thereby inserted into latch 309 while the frame $n_s$ corresponding thereto is inserted into latch 320 as per operation box 1140. In the absence of signal DL from comparator 311, the contents of latches 309 and 320 remain unaltered. Control 440 is then operative to generate pulse IN1D which is supplied to starting frame counter 230 via OR-gate 463 to increment the scanning frame $n_s$ as in index box 1150. Where the incremented frame $n_s$ is the ending frame of the utterance (decision box 1160), signal NMS is provided by starting frame counter 230 to terminate the range setting operation by causing range control 430 to produce ending signal ED.

During the sequence of range scanning operations, the $n_s$ value from frame counter 230 is applied to one input of subtractor 330 via AND-gate 324 and OR-gate 326. Subtractor 330 is operative to generate a signal $Nm-n_{dp}$. Comparator 332 enables signal DE when the $n_{dp}$ signal is within the ending frame range $\delta$END as per decision box 1170. When signal DE is enabled, the minimum distance frame $n_{dp}$ constitutes a valid ending frame for the level processing and the level processing is terminated. For level L32 1, the minimum normalized distance signal in latch 309 from (Table 1) is $d_p/n_{dp}=12.6/33=0.382$ and the $n_{dp}$ frame corresponding thereto is 33. Consequently signal DE at the output of comparator 332 is not enabled and the initialization mode illustrated in the flow diagram of FIG. 8 is started.

Signal ED from range control 440 and signal $\overline{DE}$ from comparator 332 are applied to sequence controller 400 at the end of the range setting mode. The sequence controller starts the initialization mode for the second level by generating control pulse SI which activates level initialization control 410. Responsive to pulse SI, control signal I and control pulse SN1I are produced in control 410. As previously described with respect to the first level initialization, signal I conditions level store address logic 290 to supply frame scan signals from frame counter 230 and the level signal L+1=2 from level counter 250 to the address inputs of level store 210. Signal I also alerts gates 274 and 284 whereby an LPN code is supplied to the input of level store section 210-2 and a zero code is applied to the input of level store section 210-1. Frame counter 230 is reset to its $n_s=1$ state by pulse SN1 from OR-gate 461 as per index setting box 810 in FIG. 8. The second level frame locations $n_s$ of level L+1=2 are then successively modified in accordance with operation boxes 820, 830 and 840.

Initially, the $n_s=1$ signal from frame counter 230 addresses the first utterance frame $n_s=1$ of level L+1=2 in store 210. The LPN code is inserted into section 210-2 and the zero code is inserted into store section 210-1 responsive to write enable pulse WLS that is derived from control pulse WLSI output of control 410. Frame counter 230 is then incremented as per index box 830 in FIG. 8 by pulse IN1I from control 410. The insertion process is repeated for the successive $n_s$ signals from frame counter 230 as long as signal $n_s$ does not exceed the utterance endframe $N_m$ (decision box 840). When $n_s=N_m$, the NMS signal from frame counter 230 is enabled. Control 410 then provides ending pulse EI to terminate the initialization mode.

Figure 9:
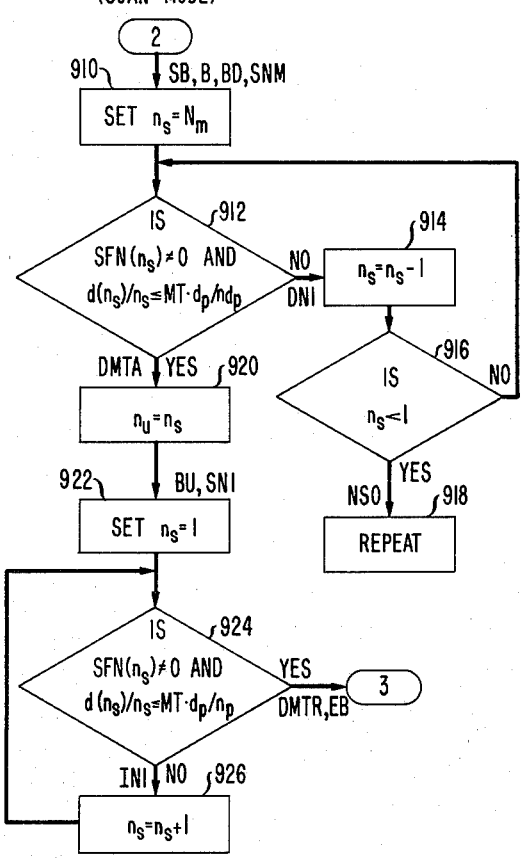

The scan mode illustrated in the flow diagram of FIG. 9 is performed under control of scan control 420. The control is activated by control pulse SB from sequence control circuit 400 by ending pulse EI. At the beginning of the scan mode, address logic 290 is conditioned to apply signal $n_s$ from frame counter 230 and signal L from level counter 250 to the address inputs of level store 210 by signal BB from controller 420. Pulse SNM sets frame counter 230 to its $n_s=N_m$ state (index box 910 in FIG. 9). The $\hat{d}(N_m)$ and $S\hat{F}N(N_m)$ signals from level store 210 are supplied to divider 355 and AND-gate 335, respectively. Signal MT is permanently set to 1.2. Divider 355 generates signal $\hat{d}(Nm)/N_m=LPN/128$ which signal is compared to the output of multiplier 303 (1.2 $d_p/n_{dp}=0.458$). Multiplier 303 may be integrated circuit Am 9511 cited previously. The signal $\hat{a}(Nm)/N_m$ exceeds the multiplier output. Signal DMT from comparator 305 is not enabled and signal DMTA from AND-gate 381 remains disabled (decision box 912). Responsive to the disabled DMTA signal from AND-gate 381, control 420 supplied a DN1 pulse to decrement frame counter 230. The counter is decremented responsive to a disabled DMTA signal for the successive frames $N_m$, $N_{m-1}$, etc. until a frame $n_s$ is reached for which $\hat{d}(n_s)/n_s \leq 0.458$. This occurs in frame $n_s=39$ for which $S\hat{F}N(39)\neq 0$ and $d(ns)/n_s=0.426$. Signal DMTA from gate 381 is then enabled. The $n_s=39$ signal is inserted into latch 350 responsive to signal DMTA and BD (box 920). Signal $n_s$ is supplied to one input of comparator 385 via gate 383. In th event $n<0$, signal NSO is enabled. Responsive to signal NSO, scan control 420 produces an RPT signal. The RPT signal initiates the operation of message synthesizer 295 and the speaker is signaled to repeat his utterance. In control 420, signal BD is disabled and signal BU is enabled by signal DMTA.

Pulse SN1B from control 420 applied via OR-gate 461 resets counter 230 to its $n_s=1$ state as per index setting box 922 in FIG. 9 so that the $\hat{d}$ (1) and the SFN(1) signals are available at lines 211-2 and 211-1, respectively. In accordance with decision box 924, the $\hat{d}(n_s)/MD$ signal is compared to range setting factor (MT).(dp/$n_{dp}$) and the starting frame $S\hat{F}N$ ($n_s$) is compared to zero to determine whether the current scan frame $n_s$ is within the prescribed range. The minimum normalized distance signal obtained during level 1 processing $dp/n_{dp}=12.6/33=0.382$ is stored in latch 309 of FIG. 3.

Signal $dp/n_{dp}$ is multiplied by the range factor MT=1.2 in multiplier 303 and the output of the multiplier is applied to one input of comparator 305. Signal $d(1)/1=LPN$ from divider 355 is supplied to the other input of comparator 305. The output of comparator 305 is not enabled. The $S\hat{F}N(1)=0$ signal is supplied to one input of comparator 338 via AND-gate 335 and OR-gate 337. The output of comparator 338 is not enabled because the $S\hat{F}N$ signal is not greater than zero. Consequently, signal DMTA from AND-gate 381 remains disabled. At this time, control 420 generates signal IN1B which increments frame counter 230 via OR-gate 463. In this way the $n_s$ signal from frame counter 230 is set to two as per index changing box 930 in FIG. 9.

The d̂ signals from level store section 210-2 have values LPN until frame $n_s=29$ is reached. The d̂$(n_s)/n_s$ signal for frame $n_s=29$ is $15.2/29=0.524$ and the SFN signal corresponding thereto is one. When the $n_s=29$ locations of level store 210 are addressed, comparator 305 remains disabled and comparator 338 is enabled. Signal DMTA remains disabled and frame counter 230 is incremented to $n_s=30$. At frame $n_s=31$, signal DMTA from AND-gate 381 is supplied to control 420 responsive to SFN(31)=1 and $$\frac{d(31)}{31} = 0.423$$

and the second level scan mode is terminated by the generation of signal EB in control 420. Pulse EB causes sequence control circuit 400 to generate control pulses FSL and SC. Pulse FSL sets abort flip-flop 291 and transfers the $n_s=31$ code into latch 501 of FIG. 5. The second level dynamic time warp processing is started at this frame. Signal SC activates DTW control 440 to initiate the DTW processing for the second level in accordance with the flow diagram of FIG. 10.

In the second level DTW processing, the range of speech pattern segment starting frames extends from frame $n_s=31$ to frame $n_s=39$. Initially control pulses SW1 and FSR and control signal C are provided by control 430 responsive to pulse SC from sequence control circuit 400. The SW1 pulse resets word counter 220 to $w=w_0$ as per index box 1005 in FIG. 10. Pulse FSR transfers the $n_s=31$ code from latch 501 to counter 503 (box 1010) and resets counter 505 to 1. Signal C conditions address logic 290 to apply the frame signal from counter 503 and the level signal $L=1$ from level counter 250 to the address control inputs n̂ and L̂ of level store 210.

Signal DST is then applied to DTW processor 207 from control 430 to start the dynamic time warp processing between the speech pattern segment feature signals of utterance frame 31 in store 203 and the zero reference word feature signals in reference word store 205. The time registration processing of processor 207 proceeds in accordance with operation box 1015 of FIG. 10 as described with respect to the first level processing. Because of the dissimilarity of the feature signals for reference word "zero" and the second level utterance segment, the dynamic time warping aborts as per decision box 1020 before an endpoint is reached in decision box 1025. Consequently, no distance signals or starting frame signals are stored in level store 210 corresponding to reference word "zero."

Jointly responsive to the AB signal from comparator 511 and the DDN signal from processor 207 at the time of the abort, control processor 430 produces pulse IW1. The IW1 pulse increments word counter 220 as indicated in index box 1050 so that the DTW processing for reference word "one" may be started. Signal FSR is generated and counter 503 is reset to starting frame code $n=31$ while counter 505 is reset to its first state. The DTW processing for reference word "one" is accomplished for each utterance frame from frame $n=31$ responsive to successive starting pulses DST from control 430, ending pulses DDN from processor 207, and incrementing pulses FSI from control 430. The operations follow the loop including operation box 1015, decision boxes 1020, 1025 and 1040, and index changing box 1045 in FIG. 10 until utterance frame 71 is processed.

At utterance frame 71, the upper limit reference word frame signal $M_H$ from DTW processor 207 is greater than the reference word ending frame $M_1^2$ for reference word "one". Signal EP, the ending frame indication, is produced by comparator 520 in FIG. 5 in accordance with decision box 1025. Signal EP is generated by control 430 and decision box 1030 is entered. The cumulative distance signal d̂ for frame 71 in level store section 210-2 is supplied to comparator 301 and the DTW cumulative distance signal $d_s$ from processor 207 is supplied to the other input thereof. The $d_s=41.2$ signal is less than d̂=LPN.

Signal E modifies address logic 290 to address the $n=71$ frame of level $L+1=2$ locations in level store 210. Signal DS from comparator 301 is enabled and control 430 produces signal WLSC. Cumulative distance signal $d_s(71)$ 41.2 and starting frame code SFN(71)=38 are then entered into level store 210 via AND-gates 280 and 274, respectively, responsive to write enable signals WLS. The identification signal for reference word "one" is placed in level store 210 via and gate 281. When the storage of signals $d_s$ and SFN is completed in accordance with operation box 1035, operation box 1015 is reentered for frame $n=72$ via decision box 1040 and index box 1045. In similar manner, an EP pulse is generated for each of utterance frames 72 and 73. The frame $n=72$ cumulative distance signal $d_s=35.2$ and starting frame code SFN=38 from processor 207 are placed in the $L+1=2$ level of store 210. For utterance frame 73, cumulative distance signal $d_s=39.1$ and signal SFN=38 from processor 207 are placed in the $L+1=2$ level of the store as per operation box 1035.

Subsequent to the processing of frame $n=73$, the dynamic time warping of operation box 1015 results in an abort signal AB from comparator 511 (decision box 1020). Upon generation of signal AB, word counter 220 is incremented by signal IW1 in accordance with index box 1050. Counter 503 is reset to frame $n=31$ as per box 1010 and the dynamic time warping for the reference word "two" is started under control of control circuit 430.

The DTW processing of reference word "two" for the second level results in time registration paths ending at speech pattern segment frames 47 through 60. A partial listing of the cumulative distance signals $d_s$ and starting frame signals SFN for these ending frames is listed in Table 2.

TABLE 2

| | Level 2 | | w = 2 |
|---|---|---|---|
| Nend | 47 | 48 | 53 |
| $d_s$ | 25.5 | 26.1 | 27.5 |
| SFN | 32 | 32 | 32 |

For each of these utterance frames, the previously stored distance signal d̂ in store 210-2 was LPN. The cumulative distance signal from processor 207 causes comparator 301 to be enabled whereby the cumulative distance signal and starting frame codes from processor 207 are entered into level store 210 responsive to signals E and WLSC from control 430.

The DTW processing for reference word "two" is terminated at the end of the speech pattern segment frame $n=60$ operation of processor 207 after signal EP is obtained from comparator 520 (box 1025) and signal $d_{s(60)}$ and SFN(60) from the processor are placed in level store 210 (box 1035). Comparator 522 is then enabled responsive to the lower limit reference word frame $M_L$ being equal to the endframe $M_w^L$ of the reference word. Signal DN is produced, after the changes in level store 210 for utterance frame 60.

The DN signal from OR-gate 528 conditions DTW control 430 to initiate the dynamic time warp processing for reference word "three" in accordance with index setting boxes 1050, 1055 and 1010. Control 430 produces pulses IW1 which increments word counter 220 to its $w=w_3$ state and pulse FSR. The FSR pulse transfers the $n=31$ signal in latch 501 to counter 503 and resets counter 505 to its first state. Pulse FSR also sets flip-flop 370 to enable signal DMTR. DTW processor 207 successively selects time registration paths responsive to the feature signals for reference word "three" from store 205 and the speech pattern segment feature signals for the frames addressed by counter 503 in accordance with operation box 1015.

The processing for the successive frames from $n=31$ follows the loop including operation box 1015, decision boxes 1020, 1025, and 1040 and indexing setting box 1045 in FIG. 10 without generation of signal EP until signal d' from processor 207 exceeds the threshold signal at the output of ROM 509. Because of the dissimilarity of the feature signals of reference word "three" and those of the second level speech pattern segment, no registration path ending point is detected in comparator 520 prior to the abort signal AB being enabled in comparator 511. Jointly responsive to the AB signal from comparator 511 and the DDN signal from processor 207 in the frame in which the abort conditions occurs, control 430 initiates the DTW processing for reference word "four" by generating signals IW1 and FSR as per index setting boxes 1050, 1055 and 1010.

Table 3 lists the ending points of the time registration paths generated during the DTW processing for reference word "four."

TABLE 3

| Level 2 | | | | w = 4 | |
|---|---|---|---|---|---|
| Nend | 59 | 60–64–71 | 72 | 73–98 | 99 |
| $d_s$ | 31.2 | 216.3–29.2–39.1 | 37.1 | 35.9–54.9 | 57.1 |
| SFN | 34 | 34–32–32 | 32 | 32–32 | 32 |

At the end of the DTW processing for speech pattern frame $n=59$ in processor 207, the $\hat{d}=30.0$ signal from level store section 210-2 is compared to the $d_s$ signal obtained from processor 207 in comparator 301. Since signal $\hat{d}=30.0$ (Table 2) is smaller than the $d_s=31.2$ signal (Table 3), comparator 301 is not enabled and the DTW processing for frame 60 is initiated without the insertion of the $d_s$ and SFN signals for frame 59 from level processor 207. As a result, level store 210 retains the $w=2$, $\hat{d}=30.0$ and SFN=32 codes which were previously inserted in utterance frame $n=59$ processing for reference word "two."

The EP signal generated in the frame $n=60$ processing for reference word "four" is effective to insert the $d_s=26.3$ and SFN=34 codes from processor 207 into level store 210. This is so because the $d_s=26.3$ signal (Table 3) is smaller than the $\hat{d}=31.2$ signal (Table 2) previously placed in level store 210 during the DTW processing of reference word "two." Similarly, the frame $n=71$ and frame $n=73$ values for reference word "four" are inserted into store 210 in place of the values obtained for reference word "one." The first $n=72$ values for reference word "one," however, are retained in store 210. In accordance with the invention, the best registration path for each ending frame of the level is stored in the level store.

After the DTW processing for utterance frame $n=99$, no ending frame is obtained in decision box 1025 prior to the termination of the DTW processing via abort decision box 1020 or endframe decision box 1040. Word index setting box 1050 may be entered responsive to either signals DDN and AB, or DDN and DN whereby control 430 generates pulses IW1 and FSR to start the DTW processing for reference word "five." The processing for reference word "five" results in time registration paths ending at utterance frames 98 through 102 as listed in Table 4.

TABLE 4

| Level 2 | | | w = 5 | | |
|---|---|---|---|---|---|
| End | 98 | 99 | 100 | 101 | 102 |
| $d_s$ | 55.9 | 56.6 | 57.8 | 59.4 | 61.5 |
| SFN | 32 | 32 | 32 | 32 | 32 |

Time registration path entries are inserted into level store 210 for utterance frames 98 and 99 of reference word "four." Paths determined in the DTW processing for reference word "five" also end at frames 98 and 99. With respect to frame 98 the cumulative distance signal for reference word "four" is less than that for reference word "five" and the signals listed in Table 3 for the frame are retained in level store 210. For utterance frame 99, the distance signal listed in Table 4 for the frame is less than that in Table 3. Consequently, the distance signal $d_s=55.9$ and the starting frame code SFN=32 at the outputs of processor 207 in frame 99 replace the distance signal and starting frame code entered into level store 210 for reference word "four."

Upon termination of the DTW processing for reference word "five" via decision box 1020 or decision box 1040, the recognition circuit of FIGS. 2 and 3 is conditioned to successively process reference words "six, seven, eight, and nine." The feature signals for these reference words, however, do not result in any time registration paths and $d_s$ and SFN signals for these reference words are not placed in level store 210. After exit from the DTW processing for reference word "nine" via abort decision box 1020, word counter 220 is incremented as per word index setting box 1050 and abort flag decision box 1060 is entered via last word decision box 1055 responsive to the enabling of signal $W_m$ in word counter 220. Signal $W_m$ causes control 400 to generate ending pulse EC which terminates the distance processing for level 2.

During the DTW processing for each reference word, signals $R_1$ and $R_2$ control the restrictions on the operation of processor 207. As previously mentioned, the selection of reference word frames varies to account for coarticulation. The range of starting frames for level 2 extends from utterance frame 31 to utterance frame 39. Signal DMTR from flip-flop 370 which occurs only during the starting frame range is applied to AND-gate 530 in FIG. 5. Between frames 31 and 39, signal DMTR is enabled. When the reference word lower limit frame signal $M_L$ from processor 207 is less than SR1, the permissible reference word frame range in processor 207 is extended to reference frame $m=1$ responsive to signal R. The $\hat{d}$ and SFN outputs from store 210 are supplied to DTW processor 207 via and gates 242 and 246 so that the starting frame and starting distance for a new time registration path can be utilized in the dynamic time warp operation of the processor. Signal DMTR limits the starting frame range of the level processing to the time registration path endpoints of the immediately preceding level. This assures time registration path continuity betwen levels.

The upper range limit speech pattern frame signal $n_w$ in latch 360 is compared to the processing frame signal n from counter 503 in comparator 366. Flip-flop 370 is set by signal FSR at frame $n_s=31$ and remains set between frames $n_s=31$ and $n_s=39$. When frame signal $n=40$ is reached, the output of comparator 366 is enabled and flip-flop 370 is reset. Gate 530 is alerted by the DMTR signal so that the range of selected reference word beginning frame between speech pattern segment frames $n_s=31$ and $n_s=39$. Gate 530 in FIG. 5 is thereafter inhibited so that processor 207 can only operate with the terminating region restrictions responsive to signal $R_2$ from comparator 511 or with the intermediate region restrictions of Equation 7.

Table 5 shows the registration path signals $\hat{w}$, $\hat{d}$, and SFN stored in the L=2 level portion of store 210 at the end of the second level DTW processing for utterance frames 47 through 102.

TABLE 5

| $n_e^2$ | $\hat{w}$ | $\hat{d}$ | SFN | $\hat{n}$ | $\hat{w}$ | $\hat{d}$ | SFN |
|---|---|---|---|---|---|---|---|
| 47 | 2 | 25.5 | 32 | 75 | 4 | 37.2 | 32 |
| 48 | 2 | 26.1 | 32 | 76 | 4 | 37.6 | 32 |
| 49 | 2 | 26.3 | 32 | 77 | 4 | 38.7 | 32 |
| 50 | 2 | 26.9 | 32 | 78 | 4 | 38.7 | 32 |
| 51 | 2 | 27.8 | 32 | 79 | 4 | 39.4 | 32 |
| 52 | 2 | 28.8 | 32 | 80 | 4 | 40.1 | 32 |
| 53 | 2 | 27.5 | 32 | 81 | 4 | 40.9 | 32 |
| 54 | 2 | 27.7 | 32 | 82 | 4 | 41.7 | 32 |
| 55 | 2 | 28.1 | 32 | 83 | 4 | 42.3 | 32 |
| 56 | 2 | 28.6 | 32 | 84 | 4 | 42.8 | 32 |
| 57 | 2 | 29.5 | 32 | 85 | 4 | 43.0 | 32 |
| 59 | 2 | 28.9 | 32 | 86 | 4 | 44.0 | 32 |
| 50 | 2 | 30.0 | 32 | 87 | 4 | 45.0 | 32 |
| 60 | 4 | 26.3 | 34 | 88 | 4 | 45.7 | 32 |
| 61 | 4 | 26.9 | 34 | 89 | 4 | 46.7 | 32 |
| 62 | 4 | 27.2 | 32 | 90 | 4 | 47.4 | 32 |
| 63 | 4 | 27.4 | 32 | 91 | 4 | 48.4 | 32 |
| 64 | 4 | 29.2 | 32 | 92 | 4 | 49.6 | 32 |
| 65 | 4 | 31.0 | 32 | 93 | 4 | 50.7 | 32 |
| 66 | 4 | 33.1 | 32 | 94 | 4 | 51.8 | 32 |
| 67 | 4 | 34.7 | 32 | 95 | 4 | 52.7 | 32 |
| 68 | 4 | 36.1 | 32 | 96 | 4 | 53.4 | 32 |
| 69 | 4 | 37.9 | 32 | 97 | 4 | 54.6 | 32 |
| 70 | 4 | 38.5 | 32 | 98 | 4 | 54.9 | 32 |
| 71 | 4 | 39.1 | 32 | 99 | 5 | 56.6 | 32 |
| 72 | 1 | 36.2 | 38 | 100 | 5 | 57.8 | 32 |
| 73 | 4 | 35.9 | 32 | 101 | 5 | 59.4 | 32 |
| 74 | 4 | 36.6 | 32 | 102 | 5 | 61.5 | 32 |

The first column lists the registration path ending frames $\hat{n}$. Column 2 lists the reference word identification $\hat{w}$ for the smallest cumulative distance path terminating at the ending frame of column 1. Column 3 lists the cumulative distance signal $\hat{d}$ for the registration path terminating at the end frame of column 1 and column 4 lists the starting frame SFN of the registration path terminating at the endframe of column 1. In the first row of Table 5, for example, the registration path endframe is $\hat{n}=47$. The reference word for the smallest cumulative distance path is $\hat{w}=2$. The path cumulative distance is $\hat{d}=25.5$ and the starting frame by this path is SFN=32.

During the second level DTW processing, abort flip-flop 291 was reset when registration path signals were first inserted into level store 210. Since level counter 250 is not in its $L_{max}$ signal LMS is disabled. Jointly responsive to disabled signals ABFF and LMS and to pulse EC from controller 430, control circuit 400 is conditioned to produce pulses IL1 and SD. The IL1 pulse increments level counter 250 to its L=2 state, and pulse SD is applied to range control 440 to initiate the range setting mode.

As described in detail with respect to level 1, the ending frames $\hat{n}$ of the just processed level L=2 are scanned as per the flow diagram of FIG. 11 to determine the minimum normalized distance signal $d_p/n_{dp}$. The minimum normalized distance signal is stored in latch 309 and the frame in which the distance signal occurred, $n_{dp}$, is stored in latch 320 in accordance with the arrangements of FIG. 11. The determined $d_p/n_{dp}$ signal for level 2 is 0.435 and the corresponding frame is 63. Since frame $n_{dp}=63$ is not within SEND=4 frames of the utterance endframe (128) at the second level (decision box 1170), the third level initialization mode is started.

In accordance with the flow diagram of the initialization mode shown in FIG. 8, each of the frame locations in level store 210 for level L+1=3 is set so that the $\hat{d}(n_s)$ signal is LPN and the SFN($n_s$) signal is zero. After the utterance endframe $N_m$ location is initialized, signal EI is obtained from level initialization control 410 (decision box 840) and the scan mode is initialized responsive to signal SB from sequence control circuit 400. The scan mode selects the range of starting frames for the third level dynamic time warp processing as per the flow diagram of FIG. 9 under control of signals from scan controller 420.

The upper limit of the range is first determined in accordance with decision box 912. Frame 88 is selected as the $n_w$ frame since the $\hat{d}(88)/88=0.519$ signal is less than $1.2(d_p/n_p)=0.522$ signal in latch 309. After the upper limit frame $n_s^1=88$ is stored in latch 360 (index setting box 920), frame counter 230 is reset to its $n_s=1$ state (index setting box 922). The distance signals from level store 210 from frame $n_s=1$ are then compared to the $1.2(dp/n_p)$ signal from multiplier 303 and the SFN signal corresponding thereto is compared to zero as per decision box 924 until speech pattern frame 53 is reached. The normalized distance signal for frame 53(0.519) is less than 1.2 $dp/n_p$(0.522) whereby the DMTR signal from flip-flop 370 is enabled. Control 420 then provides ending signal EB (decision box 924) and the DTW processing mode of the flow diagram of FIG. 10 is entered.

The level three DTW processing of the flow chart of FIG. 10 results in the generation of time registration paths for which cumulative distance signals $\hat{d}$, the starting frame signals SFN and the selected reference word signals $\hat{w}$ are stored in level store 210. Table 6 lists the $\hat{w}$, $\hat{d}$, and SFN signals inserted into level store 210 for the third level DTW processing.

TABLE 6

| $\hat{n}$ | $\hat{w}$ | $\hat{d}$ | SFN | $\hat{n}$ | $\hat{w}$ | $\hat{d}$ | SFN |
|---|---|---|---|---|---|---|---|
| 75 | 4 | 37.1 | 60 | 102 | 5 | 43.3 | 60 |
| 76 | 4 | 37.4 | 60 | 103 | 0 | 51.2 | 78 |
| 77 | 4 | 37.6 | 60 | 104 | 0 | 52.4 | 78 |
| 78 | 4 | 39.9 | 60 | 105 | 0 | 53.9 | 78 |
| 79 | 1 | 38.3 | 63 | 106 | 4 | 54.2 | 85 |
| 80 | 1 | 38.3 | 63 | 107 | 4 | 53.6 | 85 |
| 81 | 1 | 38.4 | 63 | 108 | 4 | 53.1 | 85 |
| 82 | 1 | 38.7 | 63 | 109 | 4 | 53.3 | 85 |
| 83 | 5 | 37.8 | 60 | 110 | 4 | 53.4 | 85 |
| 84 | 5 | 36.1 | 60 | 111 | 4 | 54.1 | 85 |
| 85 | 5 | 35.0 | 60 | 112 | 4 | 55.0 | 85 |
| 86 | 5 | 34.4 | 60 | 113 | 4 | 56.3 | 85 |
| 87 | 5 | 33.2 | 60 | 114 | 4 | 57.6 | 85 |
| 88 | 5 | 32.9 | 60 | 115 | 4 | 58.8 | 85 |
| 89 | 5 | 33.0 | 60 | 116 | 3 | 60.3 | 93 |

TABLE 6-continued

| $\hat{n}$ | $\hat{w}$ | $\hat{d}$ | SFN | $\hat{n}$ | $\hat{w}$ | $\hat{d}$ | SFN |
|---|---|---|---|---|---|---|---|
| 90 | 5 | 33.1 | 60 | 117 | 3 | 59.6 | 89 |
| 91 | 5 | 33.7 | 60 | 118 | 3 | 58.4 | 89 |
| 92 | 5 | 34.3 | 60 | 119 | 3 | 58.4 | 89 |
| 93 | 5 | 35.0 | 60 | 120 | 3 | 59.0 | 89 |
| 94 | 5 | 35.9 | 60 | 121 | 3 | 59.7 | 89 |
| 95 | 5 | 36.6 | 60 | 122 | 3 | 60.2 | 91 |
| 96 | 5 | 36.8 | 60 | 123 | 3 | 60.6 | 91 |
| 97 | 5 | 37.1 | 60 | 124 | 3 | 60.9 | 91 |
| 98 | 5 | 37.3 | 60 | 125 | 3 | 61.4 | 89 |
| 99 | 5 | 38.2 | 60 | 126 | 3 | 61.8 | 89 |
| 100 | 5 | 39.5 | 60 | 127 | 3 | 62.6 | 89 |
| 101 | 5 | 41.2 | 60 | 128 | 3 | 62.9 | 89 |

The level 3 ending frames of Table 6 extend from frame 75 to utterance ending frame 128. All starting frames SFN in Table 6 are within the range SFN=53 through SFN=89 determined by the range restriction operation preceding the level 3 processing.

Only the feature signals of reference words "zero, one, three, four and five" were sufficiently similar to the feature signals of the level 3 speech pattern segment to provide acceptable registration paths. For reference word "zero," the paths have utterance frame ending frames between frames 103 and 105. The ending frames for reference word "one" paths extend from utterance frame 79 through utterance frame 82. For reference word "four," ending frames extend between frames 75 through 79 and between frames 106 through 115. For the reference word "five" the path ending frames are between frame 84 and frame 102.

At the end of the DTW processing for reference word "nine" of level 3, the abort flag is found to be reset in decision box 1060, level counter 250 is incremented to its L=3 state and the range setting mode shown in FIG. 11 is initiated via decision box 1070.

As described with respect to the preceding level, the results of the level 3 DTW processing stored in level store 210 are scanned from frame $n_s=1$ to the utterance endframe $N_m=128$. The cumulative distance signal for endframe 90 in Table 6 in 33.1 and the normalized distance corresponding thereto (0.368) is determined to be minimum through the operation of divider 355, latch 309, and comparator 311. The 0.368 signal is stored in latch 309. The frame $n_s=90$ signal corresponding to the minimum normalized distance is loaded into latch 320 during the scan operation and is supplied to subtractor 330 as signal $n_{dp}$ to determine how far $n_{dp}$ is from the utterance endframe $N_m$. The output of subtractor 330 is compared to SEND=4 in comparator 332. Since $N_m-n_{dp}$ is 38 frames, signal DE from comparator 332 is not enabled and the processing for the fourth level is required.

Referring to the general flow diagram of FIG. 6, the initialization of the fourth level frame locations in level store 210 is performed in accordance with box 605 so that each utterance frame cumulative distance signal d is set to LPN and each starting frame signal SFN is set to zero. The utterance frame locations for level 3 are then scanned in accordance with box 607 to determine the range of permissible starting frames. Jointly responsive to the stored minimum normalized distance signal in latch 309 and the normalized distance signals determined for the cumulative distances from level store section 210-2, the upper limit frame $n_s=102$ is selected as $n_{dp}$ and is placed in latch 360. Subsequently, the lower limit frame $n_s=84$ is selected and placed into latch 501 preparatory to the DTW processing of level 4 in accordance with box 609.

Table 7 lists the registration path endpoints, the selected reference word signal, the cumulative distance signals and the starting frame signals for the time registration paths resulting from the fourth level processing (box 609).

TABLE 7

| $\hat{n}$ | $\hat{w}$ | $\hat{d}$ | SFN | $\hat{n}$ | $\hat{w}$ | $\hat{d}$ | SFN |
|---|---|---|---|---|---|---|---|
| 96 | 3 | 48.2 | 84 | 113 | 3 | 45.5 | 94 |
| 97 | 3 | 46.3 | 85 | 114 | 3 | 44.7 | 94 |
| 98 | 2 | 44.5 | 85 | 115 | 3 | 44.5 | 94 |
| 99 | 2 | 43.0 | 86 | 116 | 3 | 44.6 | 94 |
| 100 | 2 | 41.5 | 87 | 117 | 3 | 45.1 | 94 |
| 101 | 2 | 41.1 | 88 | 118 | 3 | 45.3 | 92 |
| 102 | 2 | 42.3 | 89 | 119 | 3 | 45.3 | 92 |
| 103 | 2 | 42.8 | 90 | 120 | 3 | 45.1 | 92 |
| 104 | 2 | 42.4 | 90 | 121 | 3 | 45.3 | 92 |
| 105 | 2 | 43.2 | 90 | 122 | 3 | 45.3 | 92 |
| 106 | 2 | 43.3 | 90 | 123 | 3 | 45.6 | 92 |
| 107 | 2 | 44.3 | 90 | 124 | 3 | 45.9 | 89 |
| 108 | 2 | 45.2 | 90 | 125 | 3 | 46.3 | 89 |
| 109 | 4 | 44.7 | 92 | 126 | 3 | 46.6 | 89 |
| 110 | 4 | 45.2 | 92 | 127 | 3 | 46.8 | 89 |
| 111 | 4 | 45.5 | 89 | 128 | 3 | 47.5 | 89 |
| 112 | 4 | 46.3 | 89 | | | | |

The determined ending frames extend between utterance frame 96 and the utterance endframe 128. The starting frame range is within the restriction set during the preceding scan mode and registration paths are found for reference words "two, three, and four." Upon completion of the dynamic time warp operation for reference word "nine" level counter 250 is incremented to its L=4 state. Since the last level has not been reached (decision box 611), the storage locations for the fifth level (L=5) are initialized as per operation box 605.

In the succeeding scan of level four endframes (operation box 607), the detected minimum normalized distance is found at frame 127. This frame signal is placed in latch 320 from which it is supplied to subtractor 330. The output of subtractor 330 corresponds to $N_m-n_{dp}=1$. The location of the minimum normalized frame is within $\delta END=4$ frames of the utterance endframe and signal DE from comparator 332 is enabled. At this time, the optimum registration path has reached the utterance endframe range and the level processing is terminated.

Endframe signal NMS from frame counter 230 causes range control 440, to generate an ED ending pulse. Jointly responsive to signal DE from comparator 332 and signal ED from range control 440, sequence control circuit 400 produces control pulse SE. The SE pulse activates backtrack control 450 which conditions the circuit of FIGS. 2 and 3 to backtrack through the time registration paths stored in level store 210 and to transfer the valid reference word candidate strings from store 210 to backtrack store 260 along with the normalized distance signals for the paths. The backtrack operation is performed in accordance with the flow diagram of FIG. 12.

At the beginning of the backtrack mode, pulse SE from control 400 causes backtrack control 450 to generate pulses SLJE, SNM, SLPN, SLT1, and signal D. Pulse SLJE is applied to level counter 250 via OR-gate 467 and causes the LB=0 signal at the output of backtrack counter 240 to be transferred into level counter 250 (index box 1205). Pulse SNM sets frame counter 230 to its $n_s=128$ state (index box 1210.) Pulse SLPN inserts an LPN signal into latch 309 while pulse SLT1 inserts a one frame signal into latch 320. Signal D conditions address logic 290 so that the L=0 signal and the $n_s$=128 signal are supplied to the address inputs of level store 210.

At this time the $n_s$=128 frame locations of level L=0 in the level store 210 are addressed. As aforementioned, the $\overline{SFN}$ signal for each frame of each level L=0 except frame $n_s$=1 and the distance signals $\hat{d}$ for each frame except frame $n_s$=1 is LPN. The $\hat{d}$ output of level store section 210-2 is normalized in divider 355 and the normalized distance signal $\hat{d}(128)/128$ therefrom is compared to the content of latch 309 in comparator 311. The content of latch 309 is less than the output of divider 355 and signal DL from comparator 311 is enabled. Consequently, the contents of latches 309 and 320 are changed to LPN/128 and 128, respectively.

Subtractor 330 produces the signal $N_m-n_s$=0 responsive to the inputs $N_m$ and input $n_s$ from gate 324. The $N_m-n_s$=0 signal is less than $\delta END$=4 (decision box 1215). Therefore, signal DE from comparator 332 is enabled. The enabled DE signal causes backtrack control 450 to generate pulse DN1 (index box 1225) which decrements frame counter 230 to its $n_s$=127 state. The sequence of DN1 pulses from backtrack control 450 continues until frame $n_s$=124 is reached. In this time interval, the minimum $\hat{d}(n_s)/n_s$ signal is placed in latch 309 and the corresponding $n_s$ signal is placed in latch 320. Signal DE from comparator 332 is then disabled whereby backtrack control 450 produces control pulse LSF.

Responsive to control pulse LSF, the minimum normalized distance frame $n_{dp}$ stored in latch 320 is inserted into latch 345 via AND-gate 336 and OR-gate 337. After a momentary delay, control 450 generates signal F which modifies address logic 290 so that $n=\hat{n}_{dp}$. The starting frame signal $\overline{SFN}(n_{dp})$ from level store section 210-1 is applied to one input of comparator 338 via AND-gate 335 and OR-gate 337. $\overline{SFN}(n_{dp})$=0 and comparator 338 enables signal SFN0. The enabled SFN0 signal signifies that there are no valid time registration paths ending at frame $n_{dp}$ in level 0. Backtrack counter 450 therefore changes state so that time registration paths ending in level 1 can be detected.

Control pulse IB1 from backtrack control 450 increments backtrack counter 240 to LB=1. Pulse SLJE causes the LB=1 signal from counter 240 to be transferred to level counter 250. Pulse SNM sets frame counter 230 to its $n_s=N_m$ state and pulses SLPN and SLT0 set latches 309 and 320 to LPN/128 and 128, respectively. The detection of the minimum normalized distance signal is then performed for level 1 in accordance with the loop including decision box 1212, box 1214 decision box 1215, and index box 1225 in the flow diagram of FIG. 12.

When frame $n_s$=124 is reached, latch 309 contains signal $d_p$=LPN/128 and latch 320 contains the signal $n_s$=0. This is so because the level 1 DTW processing did not result in time registration paths within the utterance endframe range. As per decision box 1230, the $\overline{SFN}$ (SF') signal is zero. Comparator 338 enables signal SFN0. Counter 240 is incremented by signal IB1 (index box 1255) and index box 1205 is entered via decision box 1260.

The level L=2 backtrack operation is then initiated by control pulses SLJE, SNM, SLPN, and SLT1, and signal D from backtrack control 450 responsive to the enabled SFN0 signal from comparator 338. As described with respect to the level 1 backtrack processing, address logic 290 supplies the $n_s$ address signals from frame counter 230 and the L=2 address signals from level counter 250 to the address inputs of level store 210. Frame counter 230 is set to its $n_s=N_m$ state and the minimum normalized distance signal $d_p/n_{dp}$ in the utterance endframe range $\delta END$ is detected and stored in latch 309. The frame corresponding to the minimum normalized distance signal $n_{dp}$ is stored in latch 320. No registration paths for the second level and within the endframe range $\delta END$. Consequently, latch 309 contains $\hat{d}_p/n_{dp}$=LPN/125 and latch 320 contains $n_{dp}$=125. At frame $n_s$=124, signal DE from comparator 332 is enabled whereby the $n_{dp}$ frame code is inserted into latch 345 responsive to signal LSF. The $\overline{SFN}$ signal for frame $n_{dp}$ is zero since no time registration paths in the level 2 DTW processing terminated in the $\delta END$ frame range. The $\overline{SFN}(n_{dp})$=0 signal causes comparator 338 to enable signal SFN0. The level 3 backtrack processing is started by signal IB1 from backtrack control 450 which increments backtrack counter 240 to LB=3.

As indicated in Table 6, the level 3 DTW processing resulted in time registration paths having ending points at frames 125, 126, 127, and 128. In accordance with decision box 1212, index setting box 1214, decision box 1215, and index box 1225 of FIG. 12, the normalized distance signals $\hat{d}(n_s)/n_s$ for these level 3 endframes are processed. The minimum normalized distance signal $d_p/n_{dp}$=0.49 is found for frame 126. After frame counter 238 reaches frame $n_s$=124, the $n_{dp}$=126 signal is transferred from latch 320 to latch 345 by signal LSF. Signal F is generated by control 450 and the $\overline{SFN}$=89 signal from level store 210 is supplied via AND-gate 335 and OR-gate 337 to an input of comparator 338. Signal SFN0 from the comparator remains disabled and signal WBS is supplied to the write enable input of backtrack store 260. At this time the $\hat{w}$=3 signal from level store section 210-3 and the $\hat{d}(126)/126$ signal from divider 355 are inserted into the L=3, LB=3 address of store 260.

The $\overline{SFN}(126)$=89 signal from level store section 210-1 is then placed in latch 345 via AND-gate 335 and OR-gate 337 responsive to signal LSF from control 450. Control pulse DL1 from backtrack control 450 decrements level counter 250 to its L=2 state. The n=89, L=2 locations of level store 210 are then addressed so that the $\hat{w}$=4, $\hat{d}(89)/89$=0.521 signals are placed in the L=2, LB=3 location of backtrack store 260. The $\overline{SFN}(89)$=32 signal from section 210-1 of the level store is inserted into latch 345 responsive to signal LSF and level counter 250 is decremented to its L=1 state by signal DL1. The backtrack store address is thereby changed to L=1, LB=3, and the $\hat{w}$=4, $\hat{d}(32)/32$=0.384 signals from the $\hat{n}$=32 frame location level L=2 are inserted into the backtrack store responsive to signal WBS from control 450.

Signal $\overline{SFN}(32)$=1 from store section 210-1 is placed in latch 345 and level counter 250 is decremented to its L=0 state (index box 1250). Signal LZS is enabled when level counter 250 is in its L=0 state. Responsive to signal LZS, control 450 generates a IB1 pulse. Backtrack counter 240 is then incremented to its LB=4 state and the fourth level backtrack operation is begun by the generation of pulses SLJE, SNM, SLPN and SLT0 and control signal D.

In the fourth level backtracking, the distance signals for the sequence of frames 128 through 125 are compared. The minimum normalized distance signal $$\frac{d(127)}{127} = 0.369$$

and the frame corresponding thereto ($n_{dp}=127$) are placed in latches 309 and 320, respectively. The starting frame $\hat{SFN}(127)=89$ is compared to zero in comparator 338. Since it is nonzero, the $\hat{w}(127)=3$ and $$\frac{d(127)}{127}$$

codes are inserted into the L=4, LB=4, position of backtrack store 260. The $\hat{SFN}(127)=89$ code is then inserted into latch 345 by signal LSF; level counter 250 is decremented to its L=3 state and the $\hat{L}=3$, $\hat{n}=89$ locations of level store 210 are accessed. The $\hat{w}(89)=5$ and $d(89)/89=0.373$ signals are placed in the L=3, LB=4 position of backtrack store 260 and the $\hat{SFN}(89)=60$ signal is inserted into latch 345. Counter 250 is decremented to its L=2 state.

The $\hat{SFN}(60)=32$ signal is nonzero. Consequently, the $\hat{L}=2$, $n=3\hat{2}$ locations of level store 210 are addressed so that the $\hat{w}(60)=4$, $d(60)/60=0.438$ are inserted into the L=2, LB=2 location of store 260. The $\hat{SFN}(60)=32$ signal is put into latch 345 and level counter 250 is decremented to its L=1 state. The $\hat{SFN}(32)=1$ signal in the $\hat{L}=1$, $\hat{n}=32$ locations of level store 210 is nonzero whereby the w(32)=4, $\hat{d}(32)/32=0.384$ signals are inserted into the L=1, LB=4 location of backtrack store 260. Signal $\hat{SFN}(32)=1$ is placed in latch 345. Counter 250 is decremented to its L=0 state in which state signal LZS is enabled. Responsive to signal LZS, the IB1 signal from control 450 increments backtrack counter 240 to its LB=5 state. At this time, LB=LMAX. Counter 240 produces an LBS signal which conditions control 450 to generate an ending pulse EE.

The backtrack processing is completed and store 260 contains the reference word string 443 that terminates at level 3 and the reference word string 4453 that terminates at level 4 as well as the distance signals corresponding thereto. Signal EE is applied to sequence control circuit 400 which produces signal DONE. The DONE signal is supplied to utilization device 390 which is adapted to retrieve the codes from the backtrack store as addressed by signals LB' and L'. The utilization device may be a data processor, a communication network or code controlled machine. The recognizer of FIGS. 2 and 3, for example, may be part of telephone apparatus arranged to receive spoken account numbers for billing purposes.

Utilization device 390 may be arranged to select the minimum distance reference word string from backtrack store 260 or may be adapted to select a prescribed length reference word string from store 260. In some arrangements, there may be restrictions as to the particular reference words in each word position. Reference word selector 207 may be incorporated into the circuit of FIG. 2 to provide only predetermined reference word feature signals for each level L responsive to the output of level counter 250 and word counter 220. For example, the first word of the speech pattern may be restricted to the numbers 2 and 3. Responsive to level signal L=0 and L=1, selector 207 is operative to select only the feature signals for digits 2 and 3 for DTW processing. The $W_m$ signal from selector 207 then terminates the first level DTW processing at the end of reference word "three" time registration path generation.

While the invention has been shown and described with reference to one embodiment thereof, it is to be understood that various modifications may be made by those skilled in the art without departing from the spirit and scope of the invention.

APPENDIX A

```
C       PROGRAM FOR SEQUENCE CONTROL (400/FIG. 6)
        LOGICAL LEV
10      CONTINUE
        LEV=.FALSE.
        CALL WAITFOR (START)
C       GET UTTERANCE
        CALL OUTPUT (MODE=A)
        CALL OUTPUT (SA)
        CALL WAITFOR (EA)
C       INITIALIZE BACKTRACK AND LEVEL
        COUNTERS
        CALL OUTPUT (SBO)
        CALL OUTPUT (SLJM)
C       PROCESSING LOOP
100     CONTINUE
C       INITIALIZE NEXT LEVEL
        CALL OUTPUT (SI)
        CALL WAITFOR (EI)
C       SCAN TO LIMIT STARTING RANGE
        CALL OUTPUT (SB)
        CALL WAITFOR (EB,REPEAT)
        IF (REPEAT .EQ.1) GO TO 10
C       TRANSFER STARTING FRAME TO FRAME
        SEQUENCER
        CALL OUTPUT (FSL)
C       PERFORM DYNAMIC TIME WARP
C       FOR THIS LEVEL
        CALL OUTPUT (SC)
        CALL WAITFOR (EC)
C       CHECK ABORT FLOP
        CALL INPUT (ABFF)
        IF (ABFF .EQ.1) GO TO 150
C       NO ABORT GO TO NEXT LEVEL
        LEV=.TRUE.
        CALL OUTPUT (IL1)
        CALL INPUT (LMS)
        IF (IMS.EQ.1) GO TO 200
C       FINISH LOOP - CALCULATE MINIMUM
C       FOR USE IN RANGE RESTRICTION
        CALL OUTPUT (SD)
        CALL WAITFOR (ED)
        GO TO 100
150     CONTINUE
C       ABORT - IS THIS FIRST LEVEL?
        IF (LEV) GO TO 200
C       ABORT ON FIRST LEVEL - ERROR
        CALL OUTPUT (REPEAT 2)
        GO TO 10
200     CONTINUE
C       FINISHED ALL LEVEL PROCESSING
C       BACKTRACK THRU LEVEL STORE
        CALL OUTPUT (SE)
        CALL WAITFOR (EE)
        CALL OUTPUT (DONE)
        GO TO 10
        END
```

APPENDIX B

```
C       PROGRAM FOR
C       LEVEL INITIALIZATION (410/FIG. 8)
10      CONTINUE
        CALL WAITFOR (SI)
        CALL OUTPUT (MODE=I)
C       RESET FRAME COUNTER
        CALL OUTPUT (SNII)
100     CONTINUE
C       WRITE DATA STORE
        CALL OUTPUT (WLSI)
C       FOR ALL FRAMES
```

APPENDIX B-continued

```
           CALL OUTPUT (INII)
           CALL INPUT (NMS)
           IF (NMS .NE. 1) GO TO 100
   C       INITIALIZATION FINISHED.
           CALL OUTPUT (EI)
           GO TO 10
           END
```

APPENDIX C

```
C          PROGRAM FOR
C          SCAN CONTROL (420/FIG. 9)
10         CONTINUE
           CALL WAIT FOR (SB)
           CALL OUTPUT (MODE=BB)
C          SET FRAME COUNTER TO MAX AND SCAN
           FORWARD
           CALL OUTPUT (SNM)
           CALL OUTPUT (BD)
100        CONTINUE
           CALL INPUT (DMTA)
           IF (DMTA .EQ. 1) GO TO 110
C          CONTINUE SCANNING BACKWARDS
           CALL OUTPUT (DN1)
           CALL INPUT (NS0)
           IF (NS0.NE. 1) GO TO 100
           CALL OUTPUT (REP)
           GO TO 100
110        CONTINUE
C          SCAN FORWARD
           CALL OUTPUT (SN1B)
           CALL OUTPUT (BU)
150        CONTINUE
           CALL INPUT (DMTR)
           IF (DMTR.EQ. 1) GO TO 200
C          CONTINUE SCAN
           CALL OUTPUT (IN1B)
           GO TO 150
200        CONTINUE
C          SCAN FINISHED
           CALL OUTPUT (EB)
           GO TO 10
           END
```

APPENDIX D

```
C          PROGRAM FOR DTW CONTROL (430/FIG. 10)
10         CONTINUE
           CALL WAIT FOR (SC)
C          SET WORD COUNTER
           CALL OUTPUT (SW1)
100        CONTINUE
C          SET COUNTER IN FRAME SEQUENCER
           CALL OUTPUT (FSR)
150        CONTINUE
           CALL OUTPUT (MODE=C)
C          RUN DTW
           CALL OUTPUT (DST)
           CALL WAIT FOR (DDN)
C          CHECK DTW ABORT
           CALL INPUT (AB)
           IF (AB.ED. 1) GO TO 250
C          CHECK ENDPOINT FLAGS
           CALL INPUT (EP)
           IF (EP .NE. 1) GO TO 200
C          CHECK DISTANCES
           CALL OUTPUT (MODE=E)
           CALL INPUT (OS)
           IF (DS.NE.1) GO TO 200
C          VALID END POINT AND SMALLER
           DISTANCE-WRITE STORE
           CALL OUTPUT (WLS)
200        CONTINUE
C          ARE WE FINISHED?
           CALL INPUT (DN)
           IF (DN.EQ.1) GO TO 250
C          NO- NEXT FRAME
           CALL OUTPUT (FSI)
250        CONTINUE
C          GO TO NEXT WORD
```

APPENDIX D-continued

```
           CALL OUTPUT (IW1)
           CALL INPUT (WM)
           IF (WM.NE.1) GO TO 100
   C       DONE ALL WORDS
           CALL OUTPUT (EC)
           GO TO 10
           END
```

APPENDIX E

```
C          PROGRAM FOR
C          RANGE CONTROL (440/FIG. 11)
10         CONTINUE
           CALL WAITFOR (SD)
           CALL OUTPUT (MODE=BF)
C          RESET FRAME COUNTER
           CALL OUTPUT (SN1D)
C          LOAD D HAT LATCH WITH LPN
           CALL OUTPUT (SLPN)
C          AND INITIALIZE NDP LATCH
           CALL OUTPUT (SLT1)
100        CONTINUE
C          FOR ALL FRAMES
           CALL OUTPUT (IN1D)
           CALL INPUT (NMS)
           IF (MNS.NE.1) GO TO 100
C          SCAN FINISHED
           CALL OUTPUT (ED)
           GO TO 10
           END
```

APPENDIX F

```
C          PROGRAM FOR BACKTRACK CONTROL
           (450/FIG. 12)
10         CONTINUE
           CALL WAITFOR (SE)
50         CONTINUE
C          RESET COUNTERS
           CALL OUTPUT (SLJE)
           CALL OUTPUT (SNM)
C          RESET LATCHES
           CALL OUTPUT (SLPN)
           CALL OUTPUT (SLT1)
           CALL OUTPUT (MODE=D)
C          LOOP BACKWARDS FOR δEND FRAMES
100        CONTINUE
           CALL INPUT (DE)
           IF (DE.ED.1) GO TO 150
           CALL OUTPUT (DN1)
           GO TO 100
150        CONTINUE
C          LATCH MINIMUM AS SF
           CALL OUTPUT (LSF)
           CALL OUTPUT(MODE=F)
200        CONTINUE
C          CHECK FOR VALID PATH
           CALL INPUT (SFNO)
           IF (SFNO.EQ.1) GO TO 250
C          UPDATE BACKTRACK STORE
           CALL OUTPUT (WBS)
C          LOOP
           CALL OUTPUT (DL1)
           CALL INPUT (LZS)
           IF(IZS.EQ.0) GO TO 200
250        CONTINUE
C          GO TO NEXT LEVEL
           CALL OUTPUT (IB1)
           CALL INPUT (LBS)
           IF (LBS.ED.0) GO TO 50
C          DONE
           CALL OUTPUT (EE)
           GO TO 10
           END
```

APPENDIX G

```
C          PROGRAM FOR FRAME DTW
C          DEFINE VARIABLES
```

APPENDIX G-continued

```
C     MLW= MAX FRAMES IN REFERENCE
C     MH,MI,MC HIGH,LOW&CENTER OF
      REFERENCE INDEXES
C     NMAX= MAX FRAMES IN UTTERANCE
C     NFRM= UTTERANCE FRAME INDEX
C     LEV=EVEN/ODD FRAME INDICATOR
      (FOR SLOPE=1/2)
C     PARAMETER DM=5; RANGE LIMIT MC±DM
C     PARAMETER DR2=1;
      RANGE EXTENSION FOR RULE 2
C     PARAMETER IRMAX=50;
      MAX SIZE OF REFERENCE
C     PARAMETER NFN=9 ;
      ELEMENTS IN FRAME VECTOR
C     PARAMETER LPN=1E99 ; LARGEST POSSIBLE #
      DIMENSION UF(NFV), RF(NFV), FLOC (IRMAX)
      DIMENSION DLOC(IRMAX),
      RLOC(IRMAX),SFLOC(IRMAX)
      DIMENSION DLAST(IRMAX),
      FLAST(IRMAX),SFLAST(IRMAX)
      DIMENSION DTMP(IRMAX)
      LOGICAL IEV
10    CONTINUE
      CALL WAITFOR (DST,RFS)
      IF (RFS) GO TO 900 ; INITIALIZATION
C     CALCULATE VALUES FOR MH,
      ML FOR THIS FRAME
      CALL INPUT (NFRM, DH, SFNH)
      NN= NMAX-NFRM
      I1= MLW-(NN*2)
      I2= MLW-(NN/2)
      IADD=0
      IF(IEV) IADD=1
      IEV .NOT.IEV
C     CALCULATE ML
      IF (I1.GT.0) GO TO 100
      ML=MI+ IADD ; 1/2 SLOPE
      GO TO 110
100   CONTINUE
      ML=MI+2
110   CONTINUE
C     CALCULATE MH
      IF (I2. GT. 0) GO TO 120
      MH=MH+2
      GO TO 130
120   CONTINUE
      MH= MH+IADD ; 1/2 SLOPE
130   CONTINUE
C     CALCULATE ± DM AROUND LAST CENTER
      MLP=MC-DM
      MHP=MC+DM
C     OUTPUT LOW VALUE
      CALL OUTPUT (ML)
C     RESTRICT RANGE
      ML=MAX(MLP,ML,0)
      MH=MIN(MHP,MH,MLW)
C     CALCULATE LOCAL DISTANCES
      DO 150 J=1, IRMAX
      DTMP(J) = 0
      RLOC(J) = 0
      SFLOC(J) = 0
150   CONTINUE
      DO 170 J=ML,MH
      CALL OUTPUT (MH=J)
      CALL INPUT (R1,R2,UF(I),RF(I),I=1,NFV)
      DO 160 K=1,NFV
      DTMP(J)=DTMP(J)+UF(k)*RF(k)
160   CONTINUE
      IF(R1.EQ.2) RLOC(k)=1
      IF(R1.EQ.2) RLOC(k)=2
170   CONTINUE
      DO 250 J=ML,MH
      FLOC(J)=1
      SFLOC(J)=SFLAST(J)
      DLOC(J)=DTMP(J) +DLAST(J)
      IF(FLAST(J).ED.1) DLOC(J)=LPN
      IF (DT+DLAST(J-1) .GT. DLOC (J) ) GO TO 180
      DLOC(J)= DTMP(J) +DLAST(J-1)
      SFLOC(J) =SFLAST(J-1)
      FLOC(J)=0
180   CONTINUE
      IF (DT+DLAST(J-2).GT. DLOC (J) ) GO TO 190
      DLOC(J)= DTMP(J) + DLAST (J-2)
      SFLOC(J)=SFLAST(J-2)
      FLOC(J)=0
190   CONTINUE
      IF(RLOCK(J).ED.0) GO TO 250
      IF(RLOCK(J).ED.2) GO TO 190
C     APPLY RULE(1)
      IF (DTMP(J) +DH.GT.DLOC(J) ) GO TO 250
      DLOC(J)= DTMP(J) +DH
      SFLOC(J)= SFNH
      FLOC(J)=0
      GO TO 250
190   CONTINUE
C     APPLY RULE 2
      DO 200 K= J-2, MLR2
      IF (DTMP(J)+DLAST(K).GT.DLOC(J) ) GO TO 200
      DLOC(J)=DTMP(J) +DLAST(K)
      FLOC(J)=0
      SFLOC(J)=SFLAST(K)
200   CONTINUE
C     CALCULATE MIN VALUE + UPDATE DATA
      PMIN=LPN
      DO 300 J=ML,MH
      IF (DLOC(J) .GT.PMIN) GO TO 290
      PMIN=DLOC(J)
      IM=J
290   CONTINUE
      SFLAST(J)=SFLOC(J)
      FLAST(J)=FLOC(J)
      DLAST(J)=DTMP(J)
300   CONTINUE
C     GENERATE OUTPUT
      CALL OUTPUT (DS=DLOC(IM),DP=DTMP(IM),
      SFLOC(IM) )
C     UPDATE DATA MIN CENTER
      MC=IM
      GO TO 10
C     INITIALIZATION SECTION - SET UP
      FOR NEXT WORD
900   CONTINUE
      CALL INPUT (NMAX,MLW)
      MLRZ=MLW-DR2
      LEV=.FALSE.
      ML=0
      MH=0
      MC=0
      DO 910 J=1,IRMAX
      DLAST(J)=0
      FLAST(J)=0
      SFLAST(J)=0
910   CONTINUE
      GO TO 10
      END
```

What is claimed is:

1. Apparatus for recognizing a speech pattern as a string of predetermined reference words comprising: means for storing a set of signals representative of the time frame sequence of acoustic features of each reference word, said time frame sequence having a beginning frame and an ending frame; means for producing a set of signals representative of the time frame sequence of acoustic features of said speech pattern, responsive to the speech pattern acoustic feature signals and the reference word acoustic feature signals for generating a plurality of reference word strings, and means for identifying the speech pattern as one of the generated reference word strings, characterized in that said reference word string generating means comprises; means for generating a set of signals for identifying successive reference word levels, means for assigning a segment of said speech pattern to each successive level, means operative in each successive level for time registering the level speech pattern segment feature signals with the reference word feature signals to produce level time registration speech pattern segment endframe signals and time registration correspondence signals for said reference words, and means responsive to the time registration endframe and time registration correspondence signals of the levels for selecting reference word strings.

2. Apparatus for recognizing a speech pattern as a string of predetermined reference words according to claim 1 further characterized in that said time registering means comprises: means responsive to the time registration speech pattern endframes of the immediately preceding level for restricting the range of time registration starting frames for the current level, and means responsive to said time registration correspondence signals, and the time registration speech pattern endframe signals for storing the best correspondence signal for each time registration endframe, a signal representative of the best corresponding reference word for each endframe and a signal representative of the time registration speech pattern starting frame corresponding to the best reference word for each endframe.

3. Apparatus for recognizing a speech pattern as a string of predetermined reference words according to claim 2 further characterized in that said speech pattern starting frame restricting means comprises: means responsive to the time registration best corresponding signals of the preceding level for selecting the minimum preceding level best correspondence signal, and means responsive to the preceding level time registration best correspondence signals and said selected minimum best correspondence signal for selecting time registration speech pattern starting frames of the current level.

4. Apparatus for recognizing a speech pattern as a string of predetermined words according to claim 3 further characterized in that said reference word string generating means further comprises: means responsive to the speech pattern feature signals for generating a signal representative of the speech pattern final frame; means operative at each level responsive to said minimum best correspondence signal for generating a signal representative of the speech pattern segment endframe having the minimum best correspondence signal; and means responsive to the minimum best correspondence endframe signal being within a prescribed range of the speech pattern final frame signal for initiating the operation of said reference word string selecting means.

5. Apparatus for recognizing a speech pattern as a string of predetermined reference words according to claim 4 further characterized in that said reference word string selecting means comprises: means responsive to the stored time registration speech pattern segment endframe signals, starting frame signals and reference word identification signals and said speech pattern final frame signal for producing signals representative of each reference word string having a time registration speech pattern endframe within said prescribed range of said speech pattern final frame.

6. Apparatus for recognizing a speech pattern as a string of predetermined reference words according to claim 1 further characterized in that said time registering means comprises: means for selecting a range of reference word frames for time registration with each level speech pattern segment frame including means responsive to the current reference word range lower limit frame being less that a first predetermined number for extending the lower reference word range limit frame to the reference word beginning frame, and means responsive to the current reference word range upper limit frame being greater than a second predetermined number for extending the upper reference word range limit frame to the reference word ending frame whereby coarticulation effects are reduced.

7. Apparatus for recognizing a speech pattern as a string of predetermined reference words according to claim 1 further characterized in that said time registering means comprises: means responsive to the feature signals of said reference word and said level speech segment feature signals for selecting a range of reference word frames for time registration with each level speech pattern segment frame, and means responsive to the reference word range lower limit frame being equal to or greater than the reference word ending frame for generating a level speech pattern segment time registration endframe.

8. Apparatus for recognizing a speech pattern as a string of predetermined reference words according to claim 1 further characterized in that said time registering means comprises: means operative in each reference word time registration of the current level responsive to the reference word feature signal and the speech pattern segment feature signals for selecting a range of reference word frames for each speech pattern segment frame, and means operative at each speech pattern segment frame responsive to the reference word registration lower limit frame being equal to or exceeding the reference word ending frame for terminating the time registration of said reference word.

9. Apparatus for recognizing a speech pattern as a string of predetermined reference words according to claim 8 further characterized in that said time registering means comprises: means operative in each level reference word time registration responsive to the reference word feature signals and the level speech pattern segment feature signals for generating a time registration correspondence signal for each level speech pattern segment frame, means responsive to the level speech pattern segment frame for generating a maximum allowable correspondence signal for said speech pattern segment frame and means responsive to said time registration correspondence signal of a speech pattern segment frame exceeding the maximum allowable correspondence signal for said speech pattern segment frame for terminating the time registration of said level reference word.

10. Apparatus for recognizing a speech pattern as a string of predetermined reference words according to claims 1, 2, 3, 4, 5, 6, 7, 8, or 9 further characterized in that said reference word generating means further comprises: means responsive to said level identification signals for selecting a prescribed set of reference words for time registration in each reference word level.

11. A method for recognizing a speech pattern as a string of predetermined reference words comprising the steps of: storing a set of signals representative of the time frame sequence of acoustic features of each reference word, said sequence having a beginning frame and an ending frame; producing a set of signals representative of the time frame sequence of acoustic features of the speech pattern; generating at least one reference word string responsive to the speech pattern acoustic feature signals and the reference word acoustic feature signals; and identifying the speech pattern as one of the generated reference word strings characterized in that said reference word string generation comprises: producing a set of signals identifying successive reference word levels; assigning a segment of the speech pattern to each successive level; for each level, time registering the level speech pattern segment feature signals with the feature signals of the reference words to produce level time registration speech pattern segment endframe signals and time registration correspondence signals for said reference words, and selecting reference word strings responsive to the time registration speech pattern endframe and time registration correspondence signals of the levels.

12. A method for recognizing a speech pattern as a string of predetermined reference words according to claim 11 further characterized in that said time registering comprises: restricting the range of time registration starting frames for the current level responsive to the time registration speech segment endframes of the immediately preceding level; and storing for each time registration speech segment endframe the best correspondence signal for said endframe, a signal representative of the best correspondence signal reference word for said endframe, and a signal representative of the time registration speech pattern starting frame corresponding to the best reference word for said endframe.

13. A method for recognizing a speech pattern as a string of predetermined reference words according to claim 12 further characterized in that the restriction of said level starting frames comprises: detecting the minimum of the preceding level best correspondence signals responsive to the time registration best correspondence signals of the preceding level, and selecting time registration speech segment starting frames for the current level responsive to the best correspondence signals of the preceding level and the detected minimum best correspondence signal of the preceding level.

14. A method for recognizing a speech pattern as a string of predetermined reference words according to claim 13 further characterized in that said reference word string generating step further comprises: generating a signal representative of the speech pattern final frame responsive to the speech pattern feature signals; at each level, generating a signal representative of the speech pattern segment endframe having the minimum best correspondence signal; and initiating the reference word string selection responsive to the minimum best correspondence endframe signal being within a prescribed range of the speech pattern final frame signal.

15. A method for recognizing a speech pattern as a string of predetermined reference words according to claim 14 further characterized in that said reference word selecting step comprises: producing signals representative of each reference word string having a time registration speech pattern endframe within a prescribed range of said speech pattern final frame responsive to the stored time registration speech pattern endframe signals, starting frame signals and reference word identification signals.

16. A method for recognizing a speech pattern as a string of predetermined reference words according to claim 11 further characterized in that said time registering comprises: selecting a range of reference word frames for registration with each level speech pattern segment frame responsive to the reference word feature signals and the speech pattern segment feature signals; including extending the reference word range lower limit frame to the reference word beginning frame responsive to the selected reference word range lower limit frame being less than a first predetermined number and extending the selected reference word range upper limit frame to the reference word ending frame responsive to the selected reference word range upper limit frame being greater than a second predetermined number.

17. A method for recognizing a speech pattern as a string of predetermined reference words according to claim 11 further characterized in that said time registering comprises: selecting a range of reference word frames for registration with each level speech pattern segment frame responsive to the reference word feature signals and the level speech segment feature signals and generating level speech pattern segment time registration endframes responsive to the selected reference word range upper limit frame being equal to or exceeding the reference word ending frame.

18. A method for recognizing a speech pattern as a string of predetermined reference words according to claim 11 further characterized in that said time registering comprises: selecting a range of reference word frames for each speech pattern segment frame at each level responsive to the reference word feature signals and the speech pattern feature signals and terminating the time registration of said level reference word responsive to the selected reference word registration range lower limit frame being equal to or exceeding the reference word ending frame.

19. A method for recognizing a speech pattern as a string of predetermined reference words according to claim 18 further characterized in that said time registering comprises: generating a time registration correspondence signal for each level speech pattern segment frame responsive to the reference word feature signals and the level speech pattern feature signals; generating a maximum allowable correspondence signal for said speech pattern segment frame responsive to the level speech pattern segment frame, and terminating the time registration of said level reference word responsive to the time registration correspondence signal of a speech pattern segment frame exceeding the maximum allowable correspondence signal for said frame.

20. A method for recognizing a speech pattern as a string of predetermined reference words according to claims 11, 12, 13, 14, 15, 16, 17, 18 or 19 further characterized in that said reference word string generation further comprises selecting a prescribed set of reference words for time registration in each reference word level responsive to the level identification signals.

21. A speech analyzer for recognizing a speech pattern as a string of predetermined reference words comprising: means for storing a set of signals representative of the time frame sequence of acoustic features of each reference word from a beginning frame to an ending frame, means for producing a set of signals representative of the time frame sequence of acoustic features of the speech pattern from a beginning frame to a final frame; means responsive to the feature signals of said reference words and said speech pattern for generating at least one reference word string; and means for identifying the speech pattern as one of said generated reference word strings, said reference word string generating means comprising: means for generating a set of signals to identify successive levels of said reference words; means for assigning a segment of said speech pattern to each successive level, means operative at each successive level responsive to the reference word and speech pattern segment feature signals for dynamically time warping feature signals of each reference word with the feature signals of the speech pattern segment assigned to the level to produce signals representative of time registration path speech pattern endframes for said reference words and signals representative of the correspondence of the reference word and speech pattern segment feature signals on said time registration path; and means responsive to the time registration path speech pattern endframe and correspondence signals of the levels for selecting strings of reference words.

22. A speech analyzer according to claim 21 wherein said dynamic time warping means further comprises: means operative at each successive level responsive to said reference word time registration speech pattern endframe and correspondence signal for selecting for each speech pattern endframe signal the time registration path having the minimum correspondence signal to said enframe; and means for storing, for each speech pattern endframe signal, a signal identifying the reference word for said minimum correspondence signal time registration path, the minimum correspondence signal, and a signal representative of the starting frame of the minimum correspondence time registration path.

23. A speech analyzer according to claim 22 wherein said dynamic time warping means further comprises: means responsive to the speech pattern endframe signals of the preceding level for restricting the speech pattern starting frames of the current level time registration paths to the speech pattern endframes of the preceding level.

24. A speech analyzer according to claim 23 wherein said current level starting frame restricting means comprises: means for detecting the smallest of the minimum speech pattern endframe correspondence signals of a level and means responsive to said detected smallest minimum correspondence signal for limiting the range of speech pattern starting frames for the succeeding level.

25. A speech analyzer according to claim 24 further comprising means for generating a signal representative of the speech pattern final frames, means operative at each level responsive to said endframe smallest minimum correspondence signal for generating a signal representative of the endframe having the smallest minimum correspondence signals; means responsive to said smallest minimum correspondence signal endframe being within a prescribed range of said speech pattern final frame for initiating the operation of said reference word storing selecting means.

26. A speech analyzer according to claim 25 wherein said reference string selecting means comprises: means responsive to the stored minimum correspondence signals, starting frame signals, and reference word identification signals stored for endframes of said levels for producing signals representative of each reference word string having a time registration endframe within a prescribed range of the speech pattern final frame.

27. A speech analyzer according to claim 24 wherein said starting frame range limiting means comprises: means responsive to a multiple of said smallest minimum correspondence signal for selecting the highest speech pattern endframe of the level having a minimum correspondence signal less than said multiple of said smallest minimum correspondence signal as the range upper limit speech pattern starting frame of the next level and selecting the lowest speech pattern endframe of the level having a minimum correspondence signal less than said multiple of said smallest minimum correspondence signal as the range lower limit starting frame of the next level.

28. A speech analyzer according to claim 21 wherein said dynamic time warping means further comprises: means responsive to the reference word and speech pattern segment feature signals for selecting a range of reference word frames for registration with each speech pattern segment frame including means responsive to the reference word range lower limit frame being less than a first predetermined number for extending the reference word lower limit frame to the reference word beginning frame and means responsive to the reference word range upper limit frame being greater than a second predetermined number for extending the reference word range upper limit frame to the reference word ending frame.

29. A speech analyzer according to claim 28 wherein said dynamic time warping means further comprises: means responsive to said reference word range upper limit frame being equal to or exceeding said reference word ending frame for detecting the level speech segment endframes of said reference words.

30. A speech analyzer according to claim 29 wherein said dynamic time warping means further comprises: means responsive to the selected reference word range lower limit frame being equal to or exceeding the reference word ending frame for terminating the dynamic time warping of said reference word.

31. A speech analyzer according to claim 30 wherein said dynamic time warping means further comprises: means responsive to the feature signals of selected reference word frames and speech pattern segment frame feature signals for generating a signal representative of the correspondence between the feature signals of the selected reference word frames and the speech pattern segment frame feature signals for each speech pattern segment frame, means for storing a maximum allowable correspondence signal for each speech pattern segment frame, and means responsive to said frame correspondence signal exceeding said frame maximum allowable correspondence signal for terminating the dynamic time warping of said level reference word.

32. A speech analyzer according to claims 21, 22, 23, 24, 25, 26, 27, 28, 29, 30 or 31 wherein said reference word generating means further comprises means responsive to the level identification signals for selecting a prescribed set of reference words for dynamic time warping in each successive level.

33. A method for recognizing a speech pattern as a string of predetermined reference words comprising the steps of: storing a set of signals representative of the time frame sequence of acoustic features of each reference word from a beginning frame to an ending frame; producing a set of signals representative of the time frame sequence of acoustic features of the speech from a beginning frame to a final frame; generating at least one reference word string responsive to the feature signals of the reference words and the feature signals of the speech pattern; and identifying the speech pattern as one of said generated reference word strings; the reference word string generating step comprising: generating a set of signals to identify successive levels of said reference words, assigning a segment of the speech pattern to each successive reference word level, at each reference word level dynamically time warping the feature signals of each reference word with the feature signals of the speech pattern segment assigned to the level to produce signals representative of time registration path speech pattern endframes for said reference word and signals representative of the correspondence of the reference word and speech pattern segment feature signals along the time registration paths, and selecting strings of reference words responsive to the time registration path speech pattern endframe and correspondence signals of the levels.

34. A method for recognizing a speech pattern as a string of predetermined reference words according to claim 33 wherein said dynamic time warping step further comprises: selecting for each speech pattern endframe signal the time registration path having the minimum correspondence signal at said endframe responsive to the reference word time registration endframe and correspondence signals of each level; storing for each speech pattern endframe signal, a signal identifying the reference word with the minimum correspondence signal time registration path, the minimum correspondence signal and a signal representative of the starting frame of the minimum correspondence time registration path.

35. A method for recognizing a speech pattern as a string of predetermined reference words according to claim 34 wherein said dynamic time warping step further comprises: restricting the speech pattern starting frames of the current level time registration paths responsive to the speech pattern endframe signals of the preceding level.

36. A method for recognizing a speech pattern as a string of predetermined reference words according to claim 35 wherein the current level speech pattern starting frame restricting step comprises: detecting the smallest of the minimum speech pattern endframe correspondence signals of a level and limiting the range of speech pattern starting frames for the succeeding level responsive to said detected smallest minimum correspondence signal and the minimum speech pattern endframe correspondence signals of the level.

37. A method for recognizing a speech pattern as a string of predetermined reference words according to claim 36 wherein said reference word string generation step further comprises: generating a signal representative of the speech pattern final frame responsive to the speech pattern feature signals; at each level, generating a signal representative of the time registration path speech pattern segment endframe having the smallest minimum corespondence signal responsive to the minimum corespondence signals; and initiating the reference word selection responsive to the smallest minimum correspondence endframe signal being within a prescribed range of the speech pattern final frame signal.

38. A method for recognizing a speech pattern as a string of predetermined reference words according to claim 37 wherein said reference word string selecting step comprises: producing signals representative of each reference word string having a time registration path speech pattern endframe within a prescribed range of said speech pattern final frame responsive to the stored time registration speech pattern endframe signals, starting frame signals, and reference word identification signals.

39. A method for recognizing a speech pattern as a string of predetermined reference words according to claim 36 wherein the speech pattern starting frame range limiting step comprises: selecting the level highest endframe having a minimum correspondence signal less than a multiple of the smallest minimum correspondence signal as the range upper limit starting frame of the next level and selecting the lowest endframe of the level having a minimum correspondence signal less than said multiple of the smallest minimum correspondence signal as the range lower limit starting frame of the next level.

40. A method for recognizing a speech pattern as a string of predetermined reference words according to claim 33 wherein the dynamic time warping step further comprises: selecting a range of reference word frames for time warping with each speech pattern segment frame responsive to the reference word and level speech pattern segment feature signals including extending the reference word range lower limit frame to the reference word beginning frame responsive to the reference word range lower limit frame being less than a first predetermined number, and extending the reference word range upper limit frame to the reference word ending frame responsive to the reference word range upper limit frame being greater than a second predetermined number.

41. A method for recognizing a speech pattern as a string of predetermined reference words according to claim 40 wherein said dynamic time warping step further comprises: detecting the level speech segment endframes for said reference words responsive to the reference word range upper limit frame being equal to or exceeding the reference word ending frame.

42. A method for recognizing a speech pattern as a string of predetermined reference words according to claim 41 wherein the dynamic time warping step further comprises: for each reference word dynamic time warping of the current level terminating the dynamic time warping of said reference word responsive to the selected reference word range lower limit frame being equal to or exceeding the reference word ending frame.

43. A method for recognizing a speech pattern as a string of predetermined reference words according to claim 42 wherein the dynamic time warping step further comprises: generating a signal representative of the correspondence between the selected reference word range frame feature signals and the speech pattern segment feature signals for each speech pattern segment frame responsive to the feature signals of the selected reference word range frames and the level speech segment frame feature signals, storing a maximum allowable correspondence signal for each level speech pattern segment frame responsive to the level speech pattern segment frame and terminating the dynamic time warping of the level reference word responsive to said level speech pattern segment frame correspondence signal exceeding the level speech pattern segment frame maximum allowable correspondence signal.

44. A method for recognizing a speech pattern as a string of predetermined reference words according to claims 33, 34, 35, 36, 37, 38, 39, 40, 41, 42 or 43 wherein said reference word generating step further comprises: selecting a prescribed set of said reference words for dynamic time warping in each successive level responsive to the level identification signals.

45. Apparatus for recognizing a speech pattern as a string of predetermined reference words according to claim 10 further characterized in that said speech pattern and reference word acoustic feature signals are spectrally derived feature signals.

46. Apparatus for recognizing a speech pattern as a string of predetermined reference words according to claim 10 further characterized in that said speech pattern and reference word acoustic feature signals are linear prediction feature signals.

47. Apparatus for recognizing a speech pattern as a string of predetermined reference words according to claim 10 further characterized in that said speech pattern and reference word acoustic feature signals are Markov derived feature signals.

48. A method for recognizing a speech pattern as a string of predetermined reference words according to claim 20 further characterized in that said speech pattern and reference word acoustic feature signals are spectrally derived feature signals.

49. A method for recognizing a speech pattern as a string of predetermined reference words according to claim 20 further characterized in that said speech pattern and reference word acoustic feature signals are linear prediction feature signals.

50. A method for recognizing a speech pattern as a string of predetermined reference words according to claim 20 further characterized in that said speech pattern and reference word acoustic feature signals are Markov derived feature signals.

* * * * *